US012654626B2

(12) United States Patent
Serra et al.

(10) Patent No.: US 12,654,626 B2
(45) Date of Patent: Jun. 16, 2026

(54) BICYCLE RACK WITH ARTICULATING WHEEL SUPPORT AND CRANK ARM RESTRAINT

(71) Applicant: Rad Gnar Products, LLC, Murray, UT (US)

(72) Inventors: Donald Serra, Murray, UT (US); Robert Tyson Creager, South Jordan, UT (US); Brandon K Conlin, Alpine, UT (US)

(73) Assignee: Rad Gnar Products, LLC, Murray, UT (US)

( * ) Notice: Subject to any disclaimer, the term of this patent is extended or adjusted under 35 U.S.C. 154(b) by 175 days.

(21) Appl. No.: 18/462,947

(22) Filed: Sep. 7, 2023

(65) Prior Publication Data

US 2024/0409037 A1     Dec. 12, 2024

Related U.S. Application Data

(60) Provisional application No. 63/506,561, filed on Jun. 6, 2023.

(51) Int. Cl.
B60R 9/10 (2006.01)
(52) U.S. Cl.
CPC ..................................... B60R 9/10 (2013.01)
(58) Field of Classification Search
CPC ....................................................... B60R 9/10
USPC ....................................................... 224/519
See application file for complete search history.

(56) References Cited

U.S. PATENT DOCUMENTS

| | | | | |
|---|---|---|---|---|
| 3,655,082 A * | 4/1972 | Garrett | ...................... | B60R 9/06 414/462 |
| 5,025,932 A * | 6/1991 | Jay | .......................... | B60R 9/048 211/20 |
| 5,462,398 A * | 10/1995 | Hymer | ...................... | B60R 9/10 414/537 |
| 6,027,133 A * | 2/2000 | Phillips | .................... | B62H 3/10 248/346.03 |
| 6,626,340 B1 * | 9/2003 | Burgess | ................... | B62H 3/00 224/570 |
| 7,806,307 B2 * | 10/2010 | Bergerhoff | .............. | B60R 9/048 224/508 |
| 7,909,213 B2 * | 3/2011 | Bergerhoff | ................ | B60R 9/10 224/924 |
| 8,418,902 B2 * | 4/2013 | Cha | .......................... | B60R 9/10 224/489 |
| 9,371,042 B1 * | 6/2016 | Dratewski | ................. | B60R 9/06 |

(Continued)

*Primary Examiner* — Peter N Helvey
(74) *Attorney, Agent, or Firm* — TechLaw Ventures, PLLC; Terrence J. Edwards

(57) ABSTRACT

Bicycle racks configured to be secured to a vehicular hitch of a towing vehicle. A bicycle rack includes a mounting post configured to be secured within a vehicular hitch of a towing vehicle. The bicycle rack includes a stationary wheel support attached to the mounting post, wherein the stationary wheel support is attached to the mounting post such that a longitudinal axis of the stationary wheel support is substantially parallel to a ground plane when the mounting post is secured within the vehicular hitch of the towing vehicle. The bicycle rack includes an articulating wheel support attached to the mounting post, wherein the articulating wheel support comprises a joint enabling the articulating wheel support to rotate about an axis disposed along a longitudinal axis of the mounting post.

18 Claims, 17 Drawing Sheets

(56) References Cited

U.S. PATENT DOCUMENTS

| | | | |
|---|---|---|---|
| 9,555,744 B1 * | 1/2017 | Roth ......................... | B60R 9/10 |
| 10,668,866 B2 * | 6/2020 | Kuschmeader .......... | B60R 9/10 |
| 11,648,885 B2 * | 5/2023 | Wang ....................... | B60R 9/10 |
| | | | 224/488 |
| 11,697,463 B2 * | 7/2023 | Foster ...................... | B60R 9/10 |
| | | | 211/20 |
| 2011/0108592 A1 * | 5/2011 | Lee .......................... | B60R 9/06 |
| | | | 224/488 |
| 2018/0072237 A1 * | 3/2018 | Kuschmeader .......... | B60R 9/10 |
| 2021/0245672 A1 * | 8/2021 | Dratewski ................ | B60R 9/06 |
| 2022/0266936 A1 * | 8/2022 | Foster ...................... | B60R 9/10 |
| 2024/0075885 A1 * | 3/2024 | Stahl ........................ | B60R 9/06 |

* cited by examiner

Ground Plane 142

102

118

BICYCLE RACK WITH ARTICULATING WHEEL SUPPORT AND CRANK ARM RESTRAINT

TECHNICAL FIELD

The present disclosure relates generally to devices for securing a bicycle and specifically to bicycle racks configured to be secured to a vehicular hitch of a towing vehicle.

BACKGROUND

Vehicular bicycle racks are a convenient and efficient means to transport bicycles, but they are associated with certain challenges. Traditional vehicular bicycle racks are difficult to load, fail to provide adequate retention of different types of bicycles, and lack stability during transport. This lack of stability presents increased risk when traveling at higher speeds or on unbalanced roadways. Additionally, vehicular bicycle racks are particularly difficult to use when attempting to transport a large, heavy, or otherwise cumbersome bicycle, such as an electric bicycle (e-bike). E-bikes are motorized bicycles with an integrated electric motor to assist the user in propulsion. E-bikes are heavier than traditional bicycles and can be particularly challenging to lift or maneuver on to a vehicular bicycle rack.

E-bikes are particularly difficult to lift on to a traditional vehicular bicycle rack due to the additional weight of the e-bike's motor and battery. Additionally, many e-bikes have a different frame design when compared with traditional bicycles, and this can make it difficult to find suitable lifting points for raising the e-bike on to the rack. Specifically, the battery or motor of the e-bike may be positioned in a way that obstructs a user's grip or makes it more challenging to balance the e-bike while lifting.

Due to the challenges associated with lifting e-bikes and installing e-bikes on to traditional vehicular bicycle racks, it is desirable to prepare improved vehicular bicycle racks that improve user experience when installing any bicycle type on to the rack. In view of the foregoing, described herein are improved systems, apparatus, and methods for installing a bicycle on to a vehicle bicycle rack.

BRIEF DESCRIPTION OF THE DRAWINGS

Non-limiting and non-exhaustive implementations of the disclosure are described with reference to the following figures, wherein like reference numerals refer to like parts throughout the various views unless otherwise specified. Advantages of the disclosure will become better understood with regard to the following description and accompanying drawings where.

DETAILED DESCRIPTION

Figure 1:
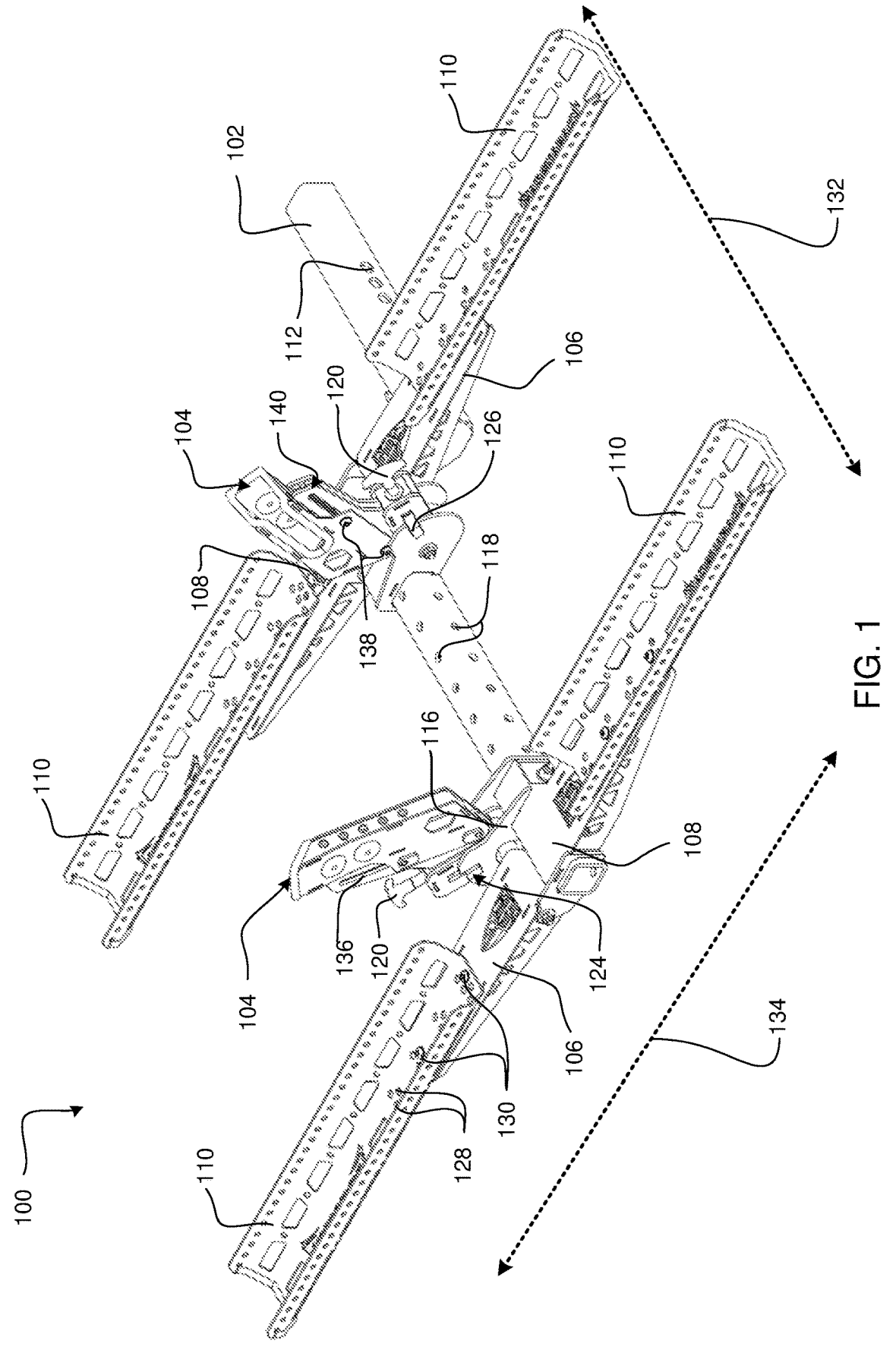
FIG. 1 is a perspective view of a bicycle rack configured to be secured to a hitch of a towing vehicle, wherein the bicycle rack is in a locked position.

Described herein are improved apparatuses, systems, and methods for installing a bicycle on to a vehicle bicycle rack. The apparatuses, systems, and methods described herein may be particularly useful when attempting to install a particularly heavy or cumbersome bicycle, such as an electric bicycle (e-bike) or another large bicycle.

The bicycle rack described herein enables a user to roll a bicycle up on to the bicycle rack with minimal lifting of the bicycle through leverage. This is particularly useful when the bicycle is heavy, cumbersome, or otherwise difficult to lift vertically. Additionally, the bicycle rack described herein provides increased security when compared to alternative bicycle racks. The bicycle rack described herein includes a crank restraint configured to securely receive a crank wheel of a bicycle and thereby securely store the bicycle without the need for additional straps or tie-downs. The bicycle rack may be equipped with one or more straps as a precautionary measure to ensure the bicycle is sufficiently stabilized on the bicycle rack.

The bicycle rack described herein includes a mounting post configured to be received by a hitch of a towing vehicle. The bicycle rack additionally includes a stationary wheel support and an articulating wheel support each attached to the mounting post. The stationary wheel support is attached to the mounting post such that it remains in a stationary configuration with its longitudinal axis substantially parallel to a ground plane when the mounting post is secured within the hitch of the towing vehicle. When a bicycle is fully installed on the bicycle rack, the stationary wheel support is configured to receive and support a front tire of a bicycle.

The articulating wheel support includes a hinge joint and is attached to a side of the mounting post such that an angle of the longitudinal axis of the articulating wheel support relative to the ground plane is adjustable. The longitudinal axis of the articulating wheel support is substantially parallel to the ground plane when the articulating wheel support is in a locked position. When the articulating wheel support is in an unlocked position, the hinge joint of the articulating wheel support is engaged, and the articulating wheel support is allowed to drop. The angle between the longitudinal axis of the articulating wheel support and the ground plane will depend on the implementation but may be from about 30° to about 80°. This enables a user to walk a bicycle up the articulating wheel support and on to the bicycle rack.

The bicycle rack described herein additionally includes a crank restraint. The crank restraint is configured to receive a crank arm of the bicycle. The crank arm of the bicycle is in mechanical communication with a gear of the bicycle and may additionally have a pedal attached thereto. The crank restraint is configured to receive the crank arm of the bicycle and allow the bicycle pedal to remain unobstructed outside the crank restraint. The crank restraint securely holds the bicycle to the bicycle rack by securely grasping the crank arm. This enables improved bicycle security when compared with traditional bicycle racks. Additionally, this enables the bicycle to be securely attached to the bicycle rack without requiring the use of additional restraints or tie-downs.

In the following description of the disclosure, reference is made to the accompanying drawings, which form a part hereof, and in which is shown by way of illustration specific implementations in which the disclosure may be practiced. It is understood that other implementations may be utilized, and structural changes may be made without departing from the scope of the disclosure.

Before the methods, systems, and devices for installing a bicycle on to a vehicular bicycle rack are disclosed and described, it is to be understood that this disclosure is not limited to the particular configurations, process steps, and materials disclosed herein as such configurations, process steps, and materials may vary somewhat. It is also to be understood that the terminology employed herein is used for the purpose of describing particular implementations only and is not intended to be limiting since the scope of the disclosure will be limited only by the appended claims and equivalents thereof.

In describing and claiming the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element, step, or ingredient not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

Figure 2:
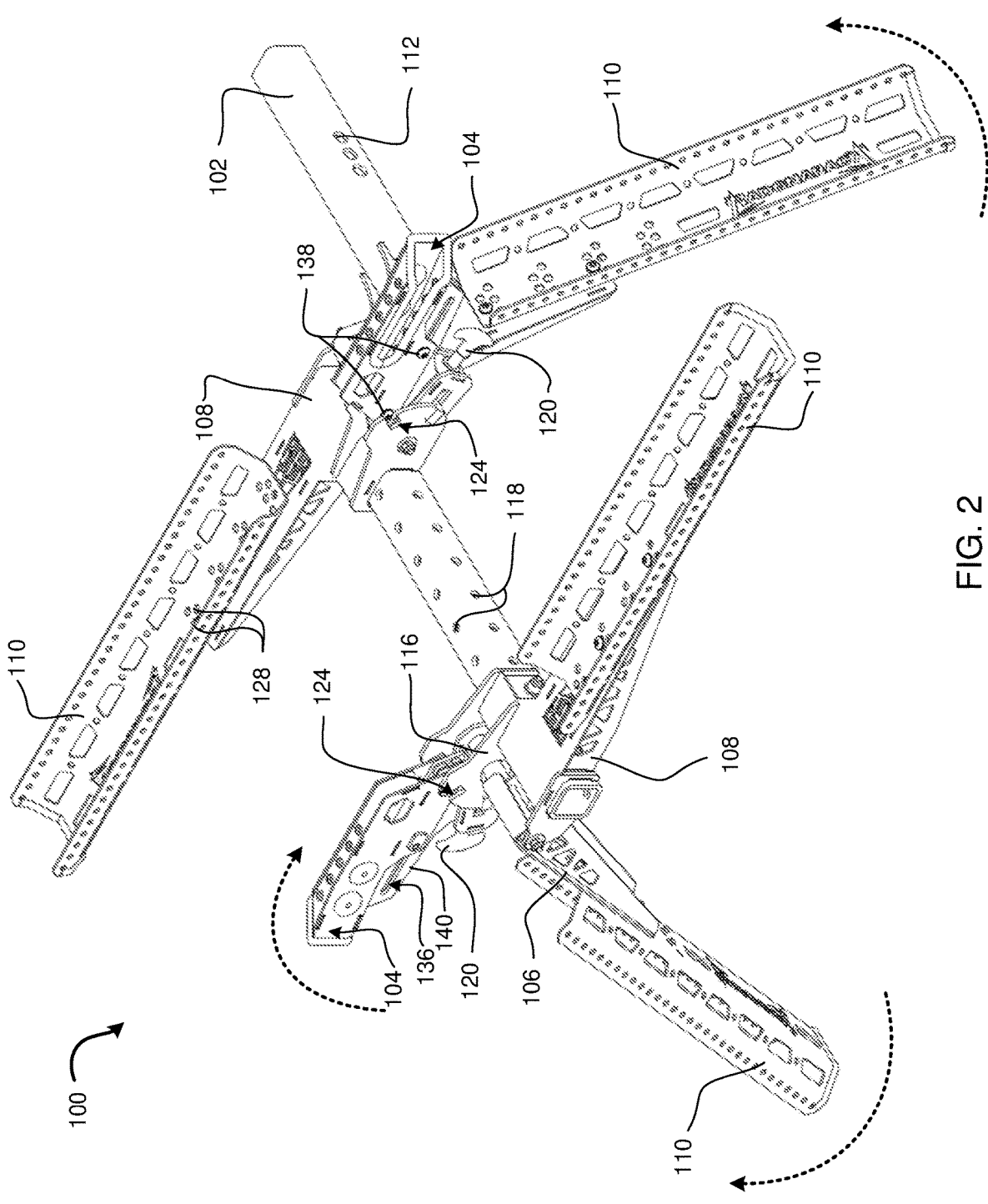
FIG. 2 is a perspective view of a bicycle rack configured to be secured to a hitch of a towing vehicle, wherein the bicycle rack is in an unlocked position.
Figure 3:
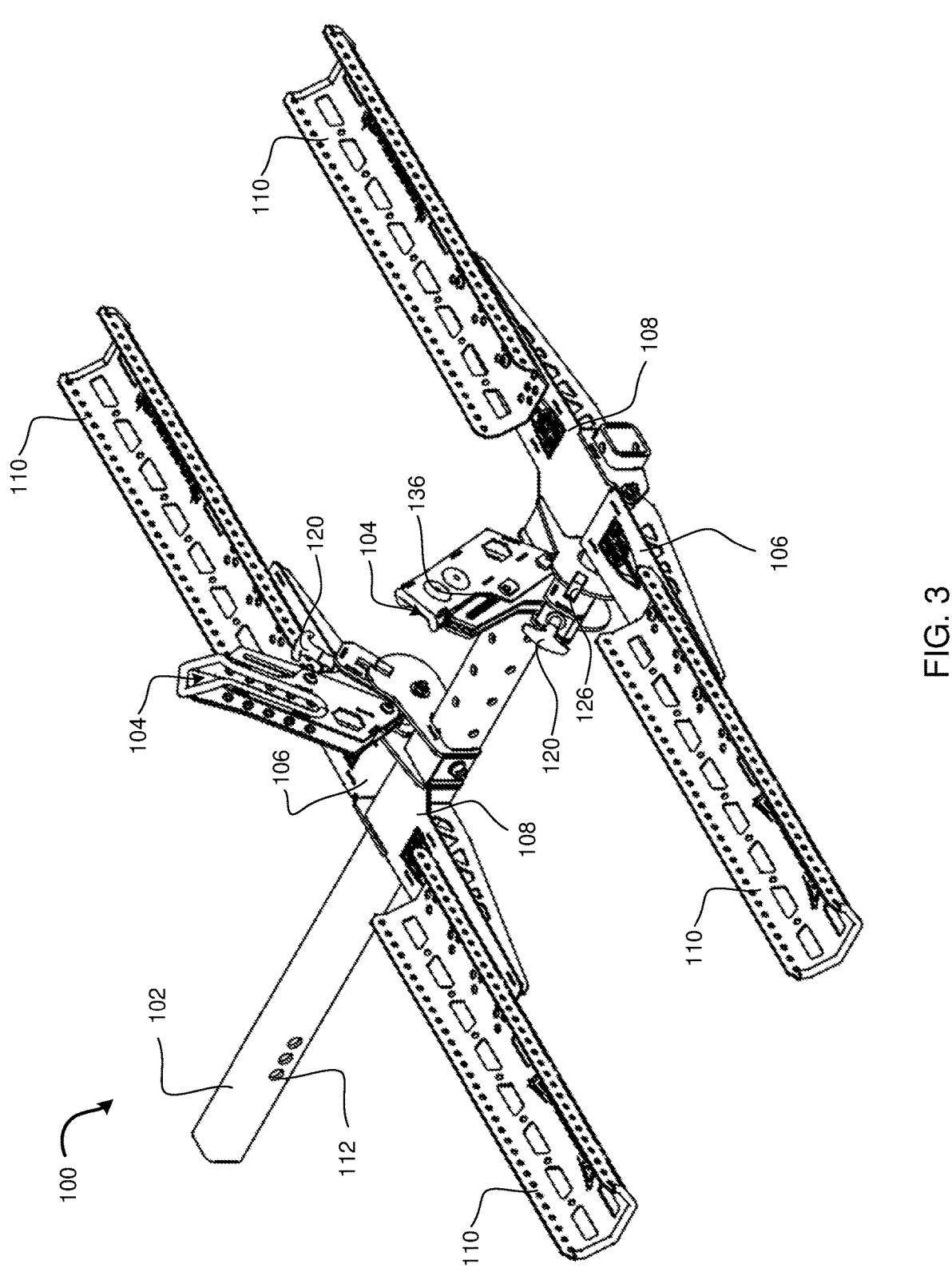
FIG. 3 is a perspective view illustrating an upper side of a bicycle rack configured to be secured to a hitch of a towing vehicle, wherein the bicycle rack is in a locked position.
Figure 4:
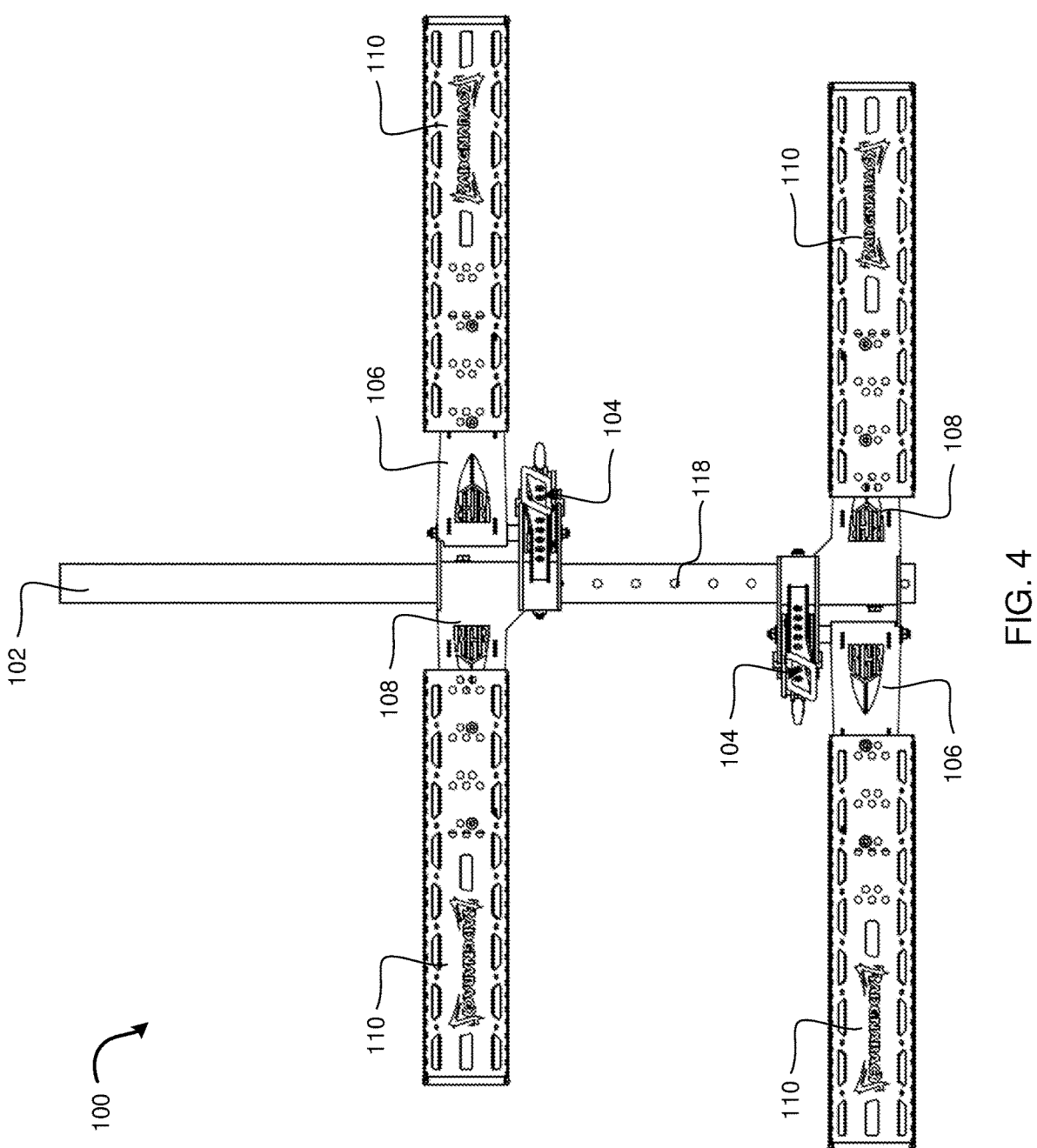
FIG. 4 is an aerial top-down view of a bicycle rack configured to be secured to a hitch of a towing vehicle, wherein the bicycle rack is in a locked position.
Figure 5:
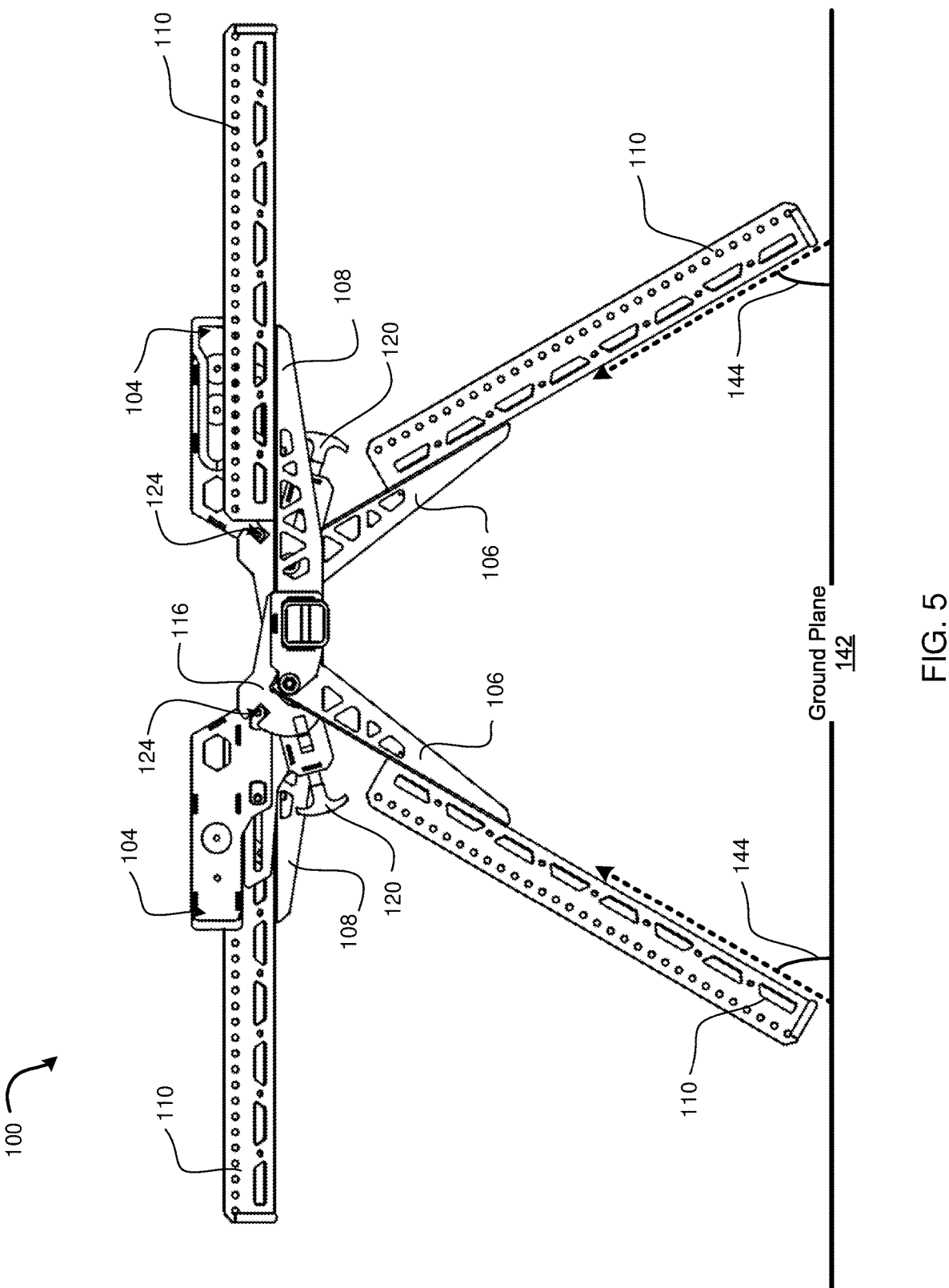
FIG. 5 is a straight-on front view of a bicycle rack if viewing the bicycle rack from the backside of a towing vehicle, wherein the bicycle rack is in an unlocked position.
Figure 6:
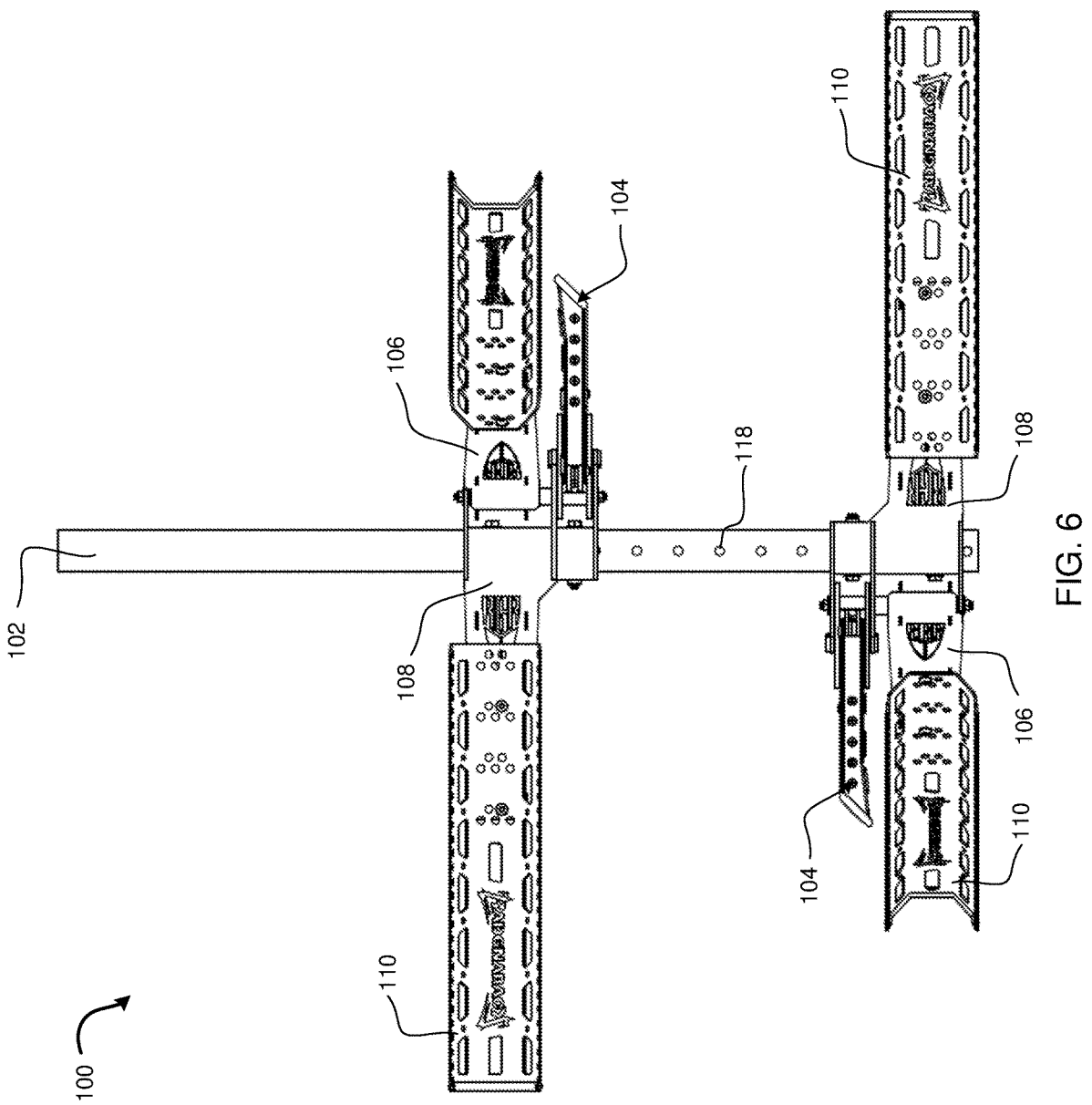
FIG. 6 is an aerial top-down view of a bicycle rack configured to be secured to a hitch of a towing vehicle, wherein the bicycle rack is in an unlocked position.
Figures 7, 8:
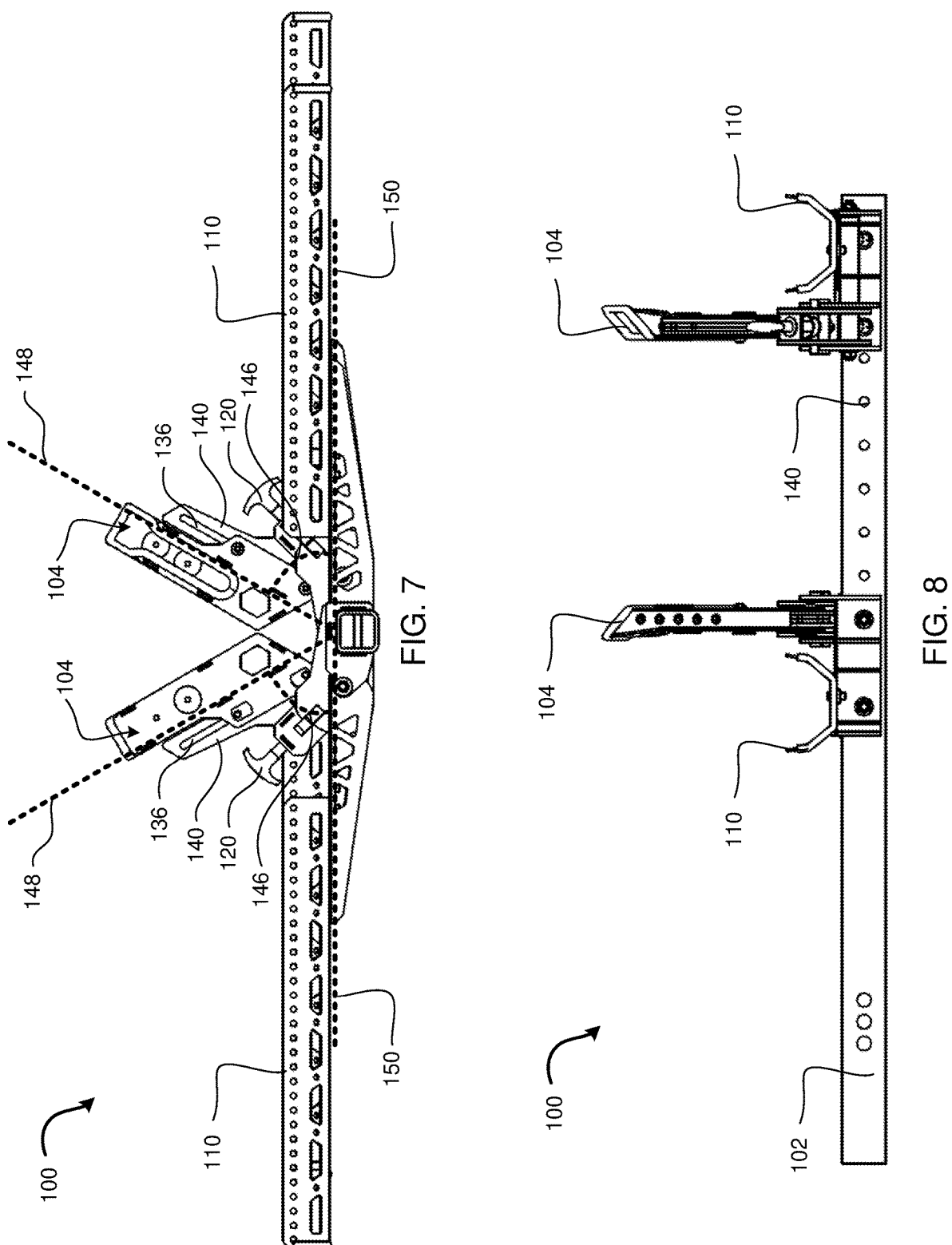
FIG. 7 is a straight-on front view of a bicycle rack if viewing the bicycle rack from the backside of a towing vehicle, wherein the bicycle rack is in a locked position.
FIG. 8 is a straight-on side view of a bicycle rack configured to be secured to a hitch of a towing vehicle, wherein the bicycle rack is in a locked position.

Referring now to the figures, FIG. 1-8 are various views of a bicycle rack 100 intended to be attached to a vehicular hitch. FIG. 1 is a perspective view illustrating an upper side of the bicycle rack 100, wherein the bicycle rack 100 is in a locked position. FIG. 2 is a perspective view illustrating an upper side of the bicycle rack 100, wherein the bicycle rack 100 is in an unlocked or open position that enables a user to easily push a bicycle up on to the bicycle rack 100. FIG. 3 is a perspective view illustrating an upper side of the bicycle rack 100 in the locked position. FIG. 4 is an aerial top-down view of the bicycle rack 100 in the locked position. FIG. 5 is a straight-on view of a "front" of the bicycle rack 100 if viewing the bicycle rack 100 from the backside of a tow vehicle, wherein the bicycle rack 100 is in the unlocked or open position. FIG. 6 is an aerial top-down view of the bicycle rack 100 in the unlocked or open position. FIG. 7 is a straight-on front view of the bicycle rack 100 if viewing the bicycle rack 100 from the backside of a tow vehicle, wherein the bicycle rack 100 is in the locked position. FIG. 8 is a straight-on wide view of the bicycle rack 100 in the locked position.

The bicycle rack 100 illustrated in FIGS. 1-8 may accommodate one or more bicycles, and may accommodate two or three bicycles oriented in opposite directions. However, it should be appreciated that the bicycle rack 100 may be constructed to accommodate one or more bicycles. In various implementations, the bicycle rack 100 may be constructed to accommodate on, two, three, four, five, or six bicycles. In most cases, the bicycle rack 100 should be limited to transporting two bicycles due to the vehicle tongue weight capacity of most vehicles. If multiple bicycles are attached to the bicycle rack 100, then the bicycles may be positioned with alternating orientations, such that a rear wheel of one bicycle sits adjacent to a front wheel of another bicycle.

The bicycle rack 100 is intended to be attached to a vehicular hitch (may alternatively be referred to as a trailer hitch or towing hitch). The corresponding vehicular hitch includes a receiver tube, and the mounting post 102 of the bicycle rack 100 is configured to be received by the corresponding receiver tube of the vehicular hitch. The mounting post 102 includes one or more mounting through-holes 112 disposed through a wall of the mounting post 102. The mounting through-holes 112 are disposed at one or more positions to adjust the degree to which the bicycle rack 100 extends outward relative to a towing vehicle. The vehicular hitch may include a hitch pin for securing the mounting post 102 within the receiver tube by depressing the hitch pin through the mounting through-holes 112 and further through corresponding through-holes on the vehicular hitch itself.

The bicycle rack 100 includes an articulating wheel support 106 and a stationary wheel support 108 for each bicycle. Thus, if the bicycle rack 100 is configured for two bicycles such as the bicycle rack 100 illustrated in FIGS. 1-8, then the bicycle rack 100 will have two articulated wheel supports 106 and two stationary wheel supports 108. The articulating wheel support 106 is configured to drop down (see, for example, FIG. 2) to enable the front wheel of a bicycle to be rolled up the articulating wheel support 106 and into position on the stationary wheel support 108. Thus, a bicycle may be installed and secured to the bicycle rack 100 without lifting the bicycle off the ground. The articulating wheel support 106 enables a user to roll a bicycle into position without lifting the bicycle up on to the bicycle rack 100.

At least FIG. 1 illustrates wherein the articulating wheel support 106 is maintained in a locked position, meaning the articulating wheel support 106 is substantially parallel to the ground plane when the bicycle rack 100 is installed within a vehicular hitch. The stationary wheel support 108 remains substantially parallel to the ground plane at all times. When the articulating wheel support 106 is in the locked position, the combination of the articulating wheel support 106 and the stationary wheel support 108 form a flat base for supporting a bicycle, wherein the stationary wheel support 108 holds a front wheel of the bicycle and the articulating wheel support 106 holds a rear wheel of the bicycle.

The bicycle rack 100 includes a crank restraint 104 configured to receive a crank arm of a bicycle. The crank arm of the bicycle is in mechanical communication with the bicycle's gear and typically includes a pedal attached thereto. The crank restraint 104 receives the crank arm of the bicycle gear and thus prevents the bicycle from moving forward, backward, or from side to side when locked into the bicycle rack 100. In most implementations, the crank restraint 104 is sufficient to secure the bicycle to the bicycle rack 100 without the use of additional straps or tie-downs. However, users may wish to further attach the wheels to the wheel trays 110 through the use of additional straps or tie-downs to provide additional security.

In some implementations, the crank restraint 104 and the articulating wheel support 106 are coupled to one another, such that a rotational position of the crank restraint 104 is adjusted simultaneously with the rotational position of the articulating wheel support 106. This is shown at least in FIG. 2, which illustrates the rotation of the crank restraint 104 and articulating wheel support 106.

When the crank restraint 104 is in the locked position (i.e., to lock a bicycle on to the bicycle rack 100), the crank restraint 104 is positioned as shown in FIG. 1, which enables the crank restraint 104 to securely hold the crank arm of a bicycle when the bicycle is resting on the wheel supports 106, 108. In this configuration, the front tire of the bicycle will rest on a wheel tray 110 attached to the stationary wheel support 108, and a rear tire of the bicycle will rest on a wheel tray 110 attached to the articulating wheel support 106. When the articulating wheel support 106 is in the locked position, the longitudinal axis of the articulating wheel support 106 (which is parallel to the transverse axis 134 of the bicycle rack 100 overall) is substantially parallel to the ground plane.

The crank restraint 104 and the articulating wheel support 106 are held in the locked position with a spring lock. The spring lock includes a pin 120 and a bolt 126. The pin 120 may include a handle attached thereto to improve user experience when pulling up on the pin 120 to disengage the spring lock. The bolt 126 is attached to the pin 120 at an angle substantially perpendicular to the pin 120. The bolt 126 is configured to be disposed within a bolt cavity 124 that is cut into a perimeter of a positioning wheel 116. The spring lock includes a spring (not shown). The spring causes the spring lock to default to a locked position, wherein the pin 120 is depressed into the crank restraint 104 and the bolt 126 is disposed within the bolt cavity 124. When a user disengages the spring lock, the user must pull on the pin 120 and compress the spring. When the user lets go of the pin 120, the spring within the spring lock will naturally relax into an uncompressed state.

The bolt cavity 124 is cut into a perimeter of the positioning wheel 116 and is configured for receiving the bolt 126 of the spring lock. When the bolt 126 of the spring lock is engaged within the bolt cavity 124, as shown in FIG. 1, the crank restraint 104 and the articulating wheel support 106 are prevented from rotational movement and locked into their respective locked positions. As discussed above, the locked position for the crank restraint 104 is optimized to enable the crank restraint 104 to securely hold a crank arm of a bicycle when the bicycle is resting on the wheel supports 106, 108. The locked position for the articulating wheel support 106 causes the longitudinal axis of the articulating wheel support 106 to be substantially parallel to the ground plane.

The crank restraint 104 may be affixed to the articulating wheel support 106 such that the crank restraint 104 and the articulating wheel support 106 rotate together. When the pin 120 is pulled and disengaged from the positioning wheel 116, each of the crank restraint 104 and the articulating wheel support 106 are free to rotate about the longitudinal axis 132 of the bicycle rack 100 and toward the ground plane. This rotation is illustrated at least at FIG. 2, which shows rotation of the crank restraint 104 and the articulating wheel support 106 in the unlocked position. The angle of the crank restraint 104 may be optimized to accommodate different bicycle sizes and configurations to ensure the crank arm of the bicycle gear may easily slide into the crank restraint 104 when the front wheel of a bicycle is rolled up the articulating wheel support 106 and on to the stationary wheel support 108.

The crank restraint 104 can slide up and down along a restraint post 140. The restraint post 140 is attached to the positioning wheel 116 and includes a sliding linear guide 136. The sliding linear guide 136 constitutes a hole cut into the restraint post 140. A corresponding post on the crank restraint 104 (not shown) is disposed within the sliding linear guide 136. This enables the crank restraint 104 to slide up and down along the crank restraint 104 to optimize the positioning of the crank restraint 104. A fastening mechanism 138 enables a user to tighten the corresponding post of the crank restraint against a sidewall of the restraint post 140 to maintain the position of the crank restraint 104. Thus, a user may loosen the fastening mechanism 138, slide the crank restraint 104 into its optimized position along the sliding linear guide 136 based on the sizing of the bicycle, and then tighten the fastening mechanism 138 to ensure the crank restraint 104 remains in the optimized position. This feature enables the bicycle rack 100 to accommodate various bicycles with different frame sizes and crank arm sizes.

Each of the articulating wheel support 106 and the stationary wheel support 108 includes a wheel tray 110 attached thereto. The wheel tray 110 is configured to support and secure a tire or wheel of a bicycle. The dimensions of the wheel tray 110 may be optimized for accommodating a wide range of tire sizes and bicycle types. In an implementation, the wheel tray 110 is wide enough to accommodate tires associated with any of a road bicycle, mountain bicycle, electric bicycle, and so forth.

The wheel trays 110 are attached to the wheel supports 106, 108 by way of a fastening mechanism 130. In some implementations, the wheel supports 106, 108 include a plurality of holes, and the wheel tray 110 includes corresponding tray holes 128. The tray holes 128 are positioned such that the wheel tray 110 can be attached to the wheel supports 106, 108 at different positions along a longitudinal axis 132 or transverse axis 134 of the bicycle rack 100. A user may align a desired tray hole 128 up with a corresponding hole on a wheel support 106, 108 to select the ideal position for the wheel tray 110. The wheel trays 110 may be positioned outward away from the mounting post 102 (along the transverse axis 134) to accommodate a longer bicycle. Conversely, the wheel trays 110 may be positioned inward toward the mounting post 102 (along the transverse axis 134) to optimize the bike rack 100 for a smaller bicycle. Additionally, the wheel trays 110 may be positioned forward or backward along the longitudinal axis 132 to accommodate different tire widths. A road bicycle may have very narrow tires, and in this implementation, a user will typically position the wheel trays 110 closer to the crank restraint 104. However, electric bicycles typically have very wide tiers, and in this implementation, a user will typically position the wheel trays 110 farther away from the crank restraint 104 to accommodate the wider tires.

Thus, a fastening apparatus 130 may be utilized to releasably attach the wheel tray 110 to an applicable wheel support 106, 108. In an implementation, the fastening apparatus 130 includes a screw threaded through corresponding holes on a wheel support 106, 108 and a wheel tray, and then a washer and/or bolt threaded on to the screw to releasably secure the wheel tray 110 to the applicable wheel support 106, 108 by pinning the wheel tray 110 tightly against the applicable wheel support 106, 108.

The mounting post 102 includes a plurality of sidewalls formed into a quadrilateral cross-sectional geometry. At least two of the plurality of sidewalls comprises a plurality of mounting holes 118 cut therethrough. The plurality of mounting holes 118 enable a user to position the bicycle support apparatus (including at least the crank restraint 104, articulating wheel support 106, and stationary wheel support 108) at different positions along the longitudinal axis 132 of the bicycle rack 100. This enables users to install varying quantities of bicycle supports on the mounting post 102, and further to optimize the distance between the bicycle supports and the towing vehicle.

The wheel supports 106, 108 may be attached directly to the mounting post 102 on an upper side of the mounting post 102. The wheel supports 106, 108 may be releasably attached to the mounting post 102 with wheel support fasteners or may be permanently affixed to the mounting post 102 by welding or similar means. If the wheel supports 106, 108 are releasably attached to the mounting post 102, they may be attached by threading a fastening screw through corresponding holes through the wheel support 106, 108 and the mounting post 102, and then tightening the components by threading a washer and/or bolt on to the fastening screw. In an implementation wherein the wheel supports 106, 108 are releasably attached to the mounting post 102, a user may easily and efficiently move the position of each bicycle on the bicycle rack 100. This may be performed to accommodate different bicycle sizes and styles.

FIG. 5 illustrates a straight-on front view wherein each of the articulating wheel supports 106 is bent downward toward the ground plane 142. As shown at least in FIG. 5, the stationary wheel supports 108 remain stationary such that they are positioned substantially parallel to the ground plane 142 when the bicycle rack 100 is installed in a vehicular hitch. The articulating wheel supports 106 bend downward toward the ground plane 142, and in some cases, the attached wheel trays 110 will touch the ground plane 142. This enables a user to roll the front wheel of a bicycle up the articulating wheel support 106 and on to the stationary wheel support 108. When the front wheel of the bicycle is resting on the stationary wheel support 108, the articulating wheel support 106 may then be raised and locked into position. When the articulating wheel support 106 is locked into position, the articulating wheel support 106 and the stationary wheel support 108 will each be substantially parallel to the ground plane 142 and will form a substantially straight line (or 180° angle).

Additionally, when the front wheel of the bicycle is rolled up the articulating wheel support 106, the crank arm of the bicycle gear may be fed into the crank restraint 104. The crank restraint includes a cavity configured for securely receiving the crank arm of the bicycle gear. This The crank restraint 104 is configured to rotate to accommodate the position of the bicycle's crank arm when the bicycle is being walked up on to the bicycle rack 100 and/or when the bicycle is stored and secured in the bicycle rack 100. The rotational position of the crank restraint 104 is secured with the crank pin 120, which is easily pulled out to enable the crank restraint 104 to rotate and depress to lock the crank restraint 104 into the locked position. The crank pin 120 may be accompanied with a spring to ensure the default position of the crank pin 120 is a locked or closed position.

When the crank restraint 104 and the articulating wheel support 106 are in the unlocked position, the spring lock is disengaged with the positioning wheel 116. The pin 120 is pulled outward relative to the crank restraint 104, and this causes the bolt 126 to lift out of the bolt cavity 124. When the bolt 126 is removed from the bolt cavity 124, the crank restraint 104 and the articulating wheel support 106 are then free to rotate down toward the ground plane 142.

As shown in FIG. 5, the longitudinal axis of the stationary wheel support 108 is configured to remain substantially parallel to the ground plane 142 at all times. However, the interior angle 144 between the longitudinal axis of the articulating wheel support 106 and the ground plane 142 is adjustable. The exact interior angle 144 will depend on the implementation and will specifically depend on the height of the mounting post 102 relative to the ground (which will depend on the hitch height on the towing vehicle), the length of the wheel trays 110 attached to the articulating wheel supports 106, and where the wheel trays 110 are attached to the articulating wheel supports 106. However, the interior angle 144 is typically less than 90° to improve user experience when attempting to roll the bicycle up the articulating wheel support 106 and on to the bicycle rack. In most cases, the interior angle 144 is from about 30° to about 80° and may specifically be from about 35° to about 55°.

The hinge joint of the articulating wheel support 106 is in a "locked" position when the longitudinal axis of the articulating wheel support 106 is substantially parallel to the ground plane 142. The hinge joint of the articulating wheel support 106 is in an "unlocked" position when the hinge joint is enabled to swing open and closed. The maximum movement of the hinge joint will depend on the same factors that govern the interior angle 144 and will specifically depend upon the height of the mounting post 102 relative to the ground (which will depend on the hitch height on the towing vehicle), the length of the wheel trays 110 attached to the articulating wheel supports 106, and where the wheel trays 110 are attached to the articulating wheel supports 106.

FIG. 7 illustrates a straight-on front view of the bicycle rack 100 when viewed from the backside of a towing vehicle. In FIG. 7, the bicycle rack 100 is in the locked position with both the articulating wheel support 106 and the stationary wheel support 108 oriented substantially parallel to the ground plane 142. FIG. 7 includes dotted lines along the longitudinal axes of the articulating wheel support 106 and the crank restraint 104 to illustrate the angle of the crank restraint 104 relative to the articulating wheel support 106.

The crank restraint angle 146 is defined by the interior angle between the crank restraint axis 148 and the wheel support axis 150. As shown in FIG. 7, the crank restraint angle 146 may be in a range from about 40° to about 65° and may specifically be about 50°. The crank restraint 104 is attached such that the crank restraint angle 146 remains fixed. This ensures that the crank restraint 104 rotates with the articulating wheel support 106 when the pin 120 is pulled and the wheel support locking assembly is disengaged. Thus, when the articulating wheel support 106 rotates down toward the ground plane 142, the crank restraint 104 will also rotate and maintain the same crank restraint angle 146 relative to the wheel support axis 150.

As shown herein, two bicycles may be stored on the bicycle rack 100 side-by-side, with each bicycle stored facing a different direction. In an implementation wherein three or more bicycles are stored on the bicycle rack 100, the bicycle orientations will alternate. Thus, the articulating wheel support 106 of a first bicycle holder will be adjacent to the stationary wheel support 108 of an adjacent bicycle holder. As discussed above, the articulating wheel support 106 is configured to bend downward relative to the vehicular hitch (i.e., toward the ground when the bicycle rack 100 is installed on a vehicular hitch) to allow the front wheel of the bicycle to be rolled up the articulating wheel support 106 and on to the stationary wheel support 108. This enables a user to walk the bicycle up on to the bicycle holder. Because the stationary wheel support 108 is intended to hold the front wheel of the bicycle, the position of the stationary wheel supports 108 (and articulating wheel supports 106) will alternate when the bicycle rack 100 accommodates more than one bicycle as shown in FIGS. 1 and 2.

Figure 9:
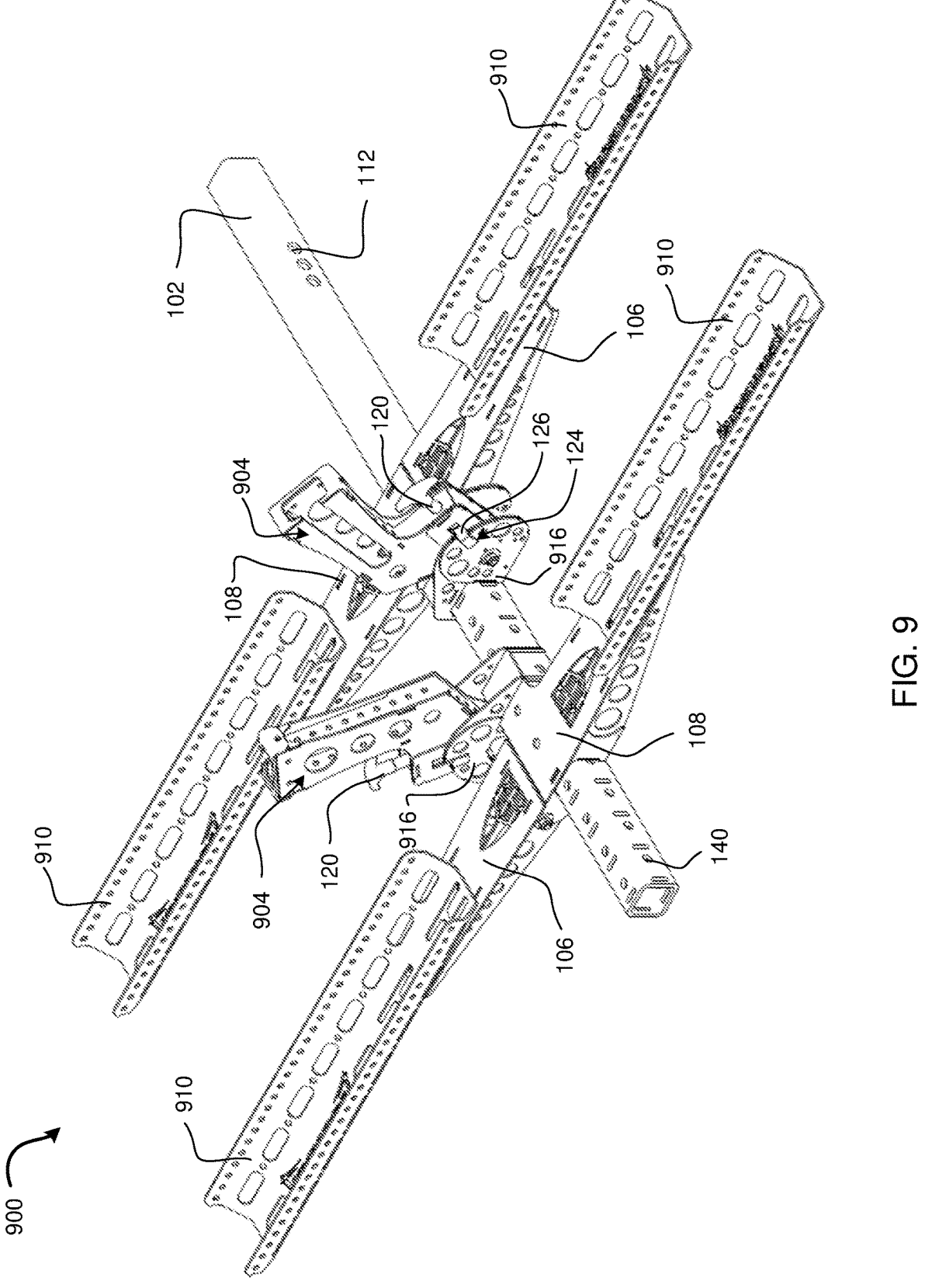
FIG. 9 is a perspective view of a bicycle rack configured to be secured to a hitch of a towing vehicle, wherein the bicycle rack is in a locked position.
Figure 10:
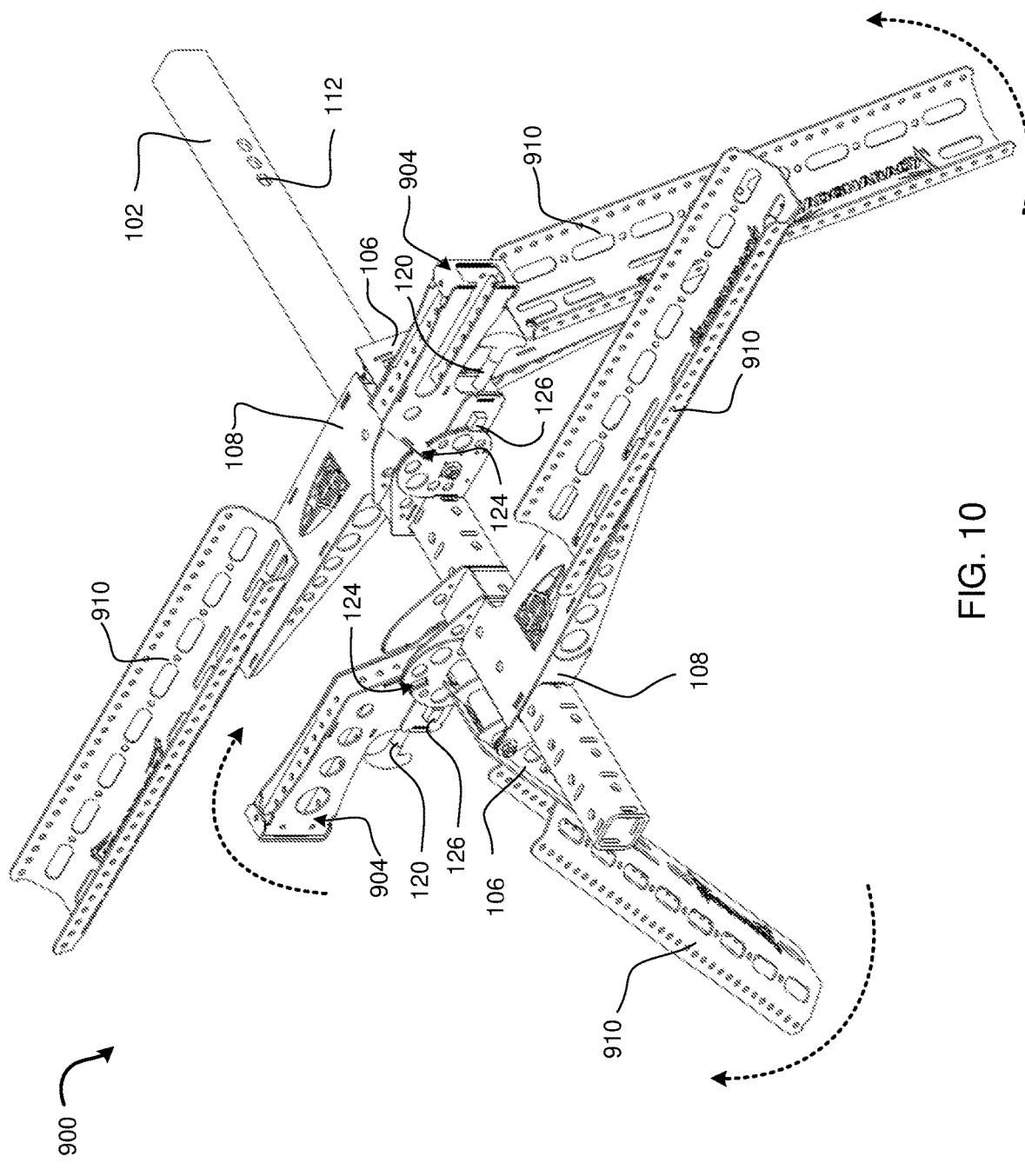
FIG. 10 is a perspective view of a bicycle rack configured to be secured to a hitch of a towing vehicle, wherein the bicycle rack is in an unlocked position.
Figure 11:
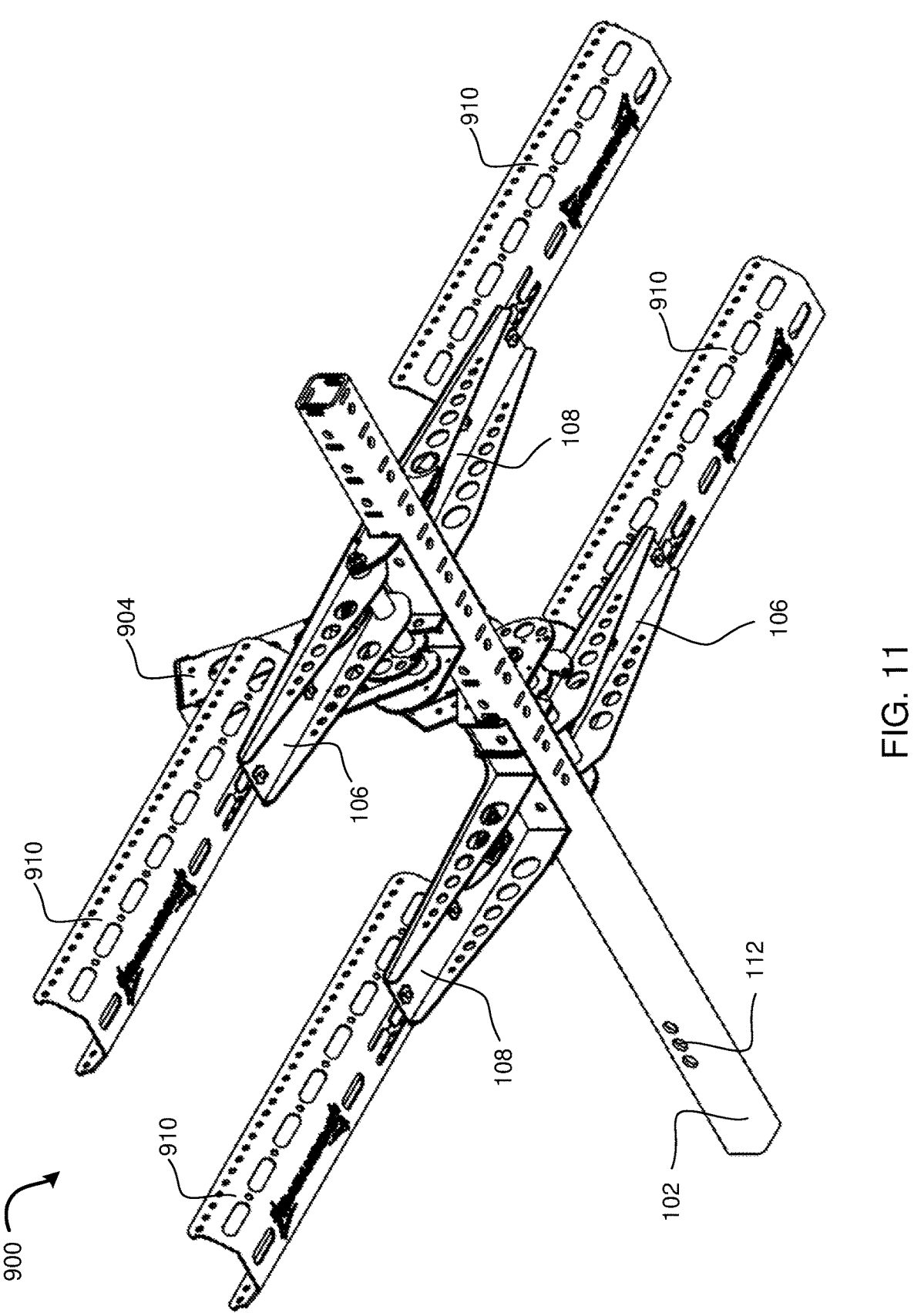
FIG. 11 is a perspective view illustrating an underside of a bicycle rack configured to be secured to a hitch of a towing vehicle, wherein the bicycle rack is in a locked position.
Figure 12:
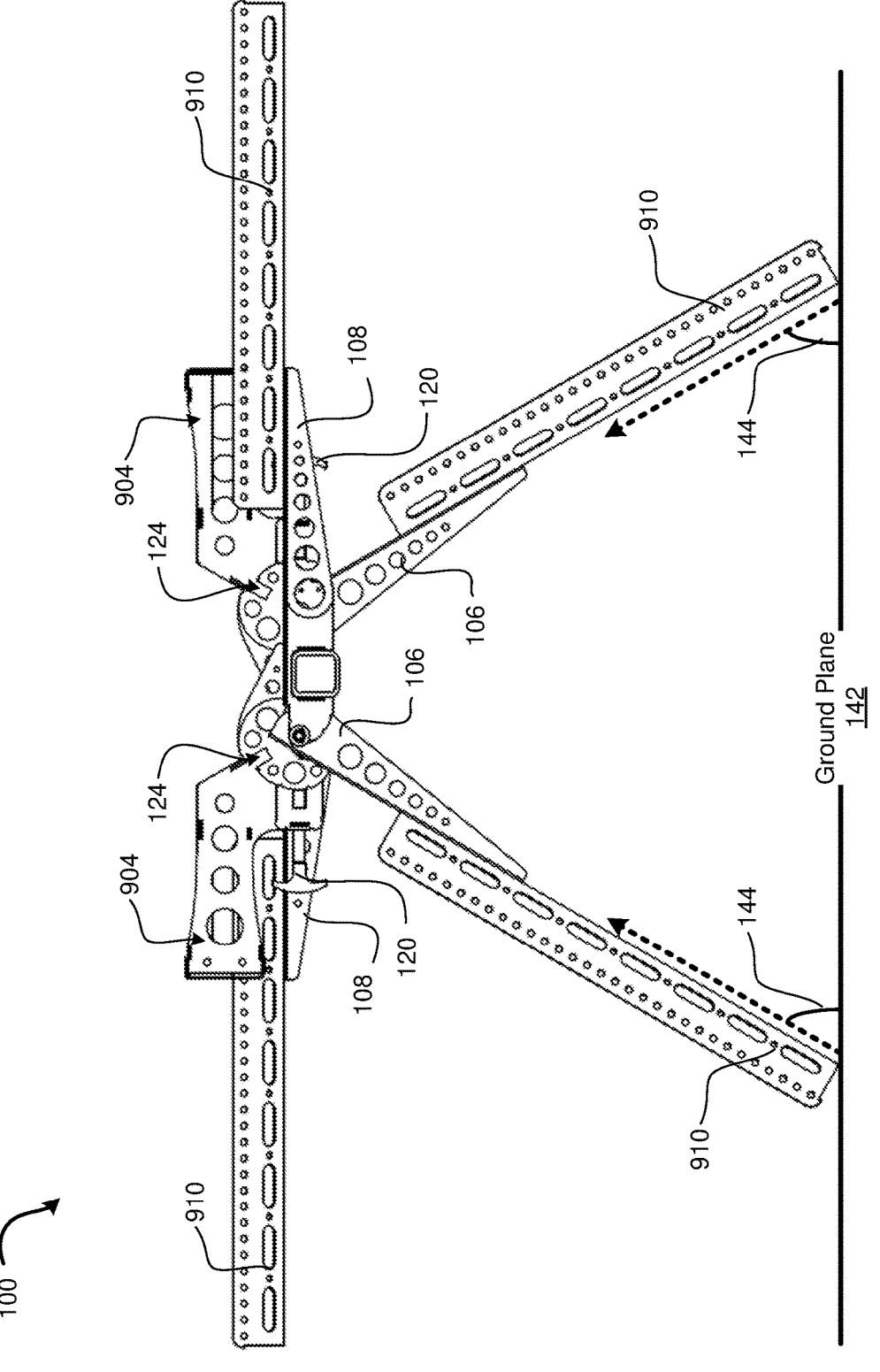
FIG. 12 is a straight-on front view of a bicycle rack if viewing the bicycle rack from the backside of a towing vehicle, wherein the bicycle rack is in an unlocked position.

FIGS. 9-12 illustrate various views of a bicycle rack 900 intended to be attached to a vehicular hitch. The bicycle rack 900 illustrated in FIGS. 9-12 includes many components like those illustrated in the embodiment of FIGS. 1-8, and these like components will be identified with the same callout numbers utilized in connection with FIGS. 1-8. However, the bicycle rack 900 includes some modified components that may be desirable in certain implementations. FIG. 9 is a perspective view of the bicycle rack 900 in the locked position. FIG. 10 is a perspective view of the bicycle rack 900 in the unlocked or open position. FIG. 11 is a perspective view of an underside of the bicycle rack 900 in the locked position. FIG. 12 is a straight-on front view of the bicycle rack 900 if viewing the bicycle rack 900 from the backside of a tow vehicle, wherein the bicycle rack 900 is in the unlocked or open position.

The bicycle rack 900 includes the articulate wheel support and the stationary wheel support 108 like the embodiment illustrated in FIGS. 1-8. However, the crank restraint 904 of the bicycle rack 900 is slightly modified relative to the crank restraint 104 illustrated in FIGS. 1-8. The crank restraint 904 similarly includes a cavity for receiving a crank arm of a bicycle to securely hold the bicycle within the bicycle rack 900. However, the crank restraint 904 does not include a means for extending or shortening the length of the crank restraint 904 relative to the mounting post 102. The embodiment illustrated in FIGS. 9-12 may be beneficial when it is not expected that the bicycle rack 900 will be utilized with varying bicycles of different sizes.

The wheel trays 910 of the bicycle rack 900 include holes disposed therethrough to lighten the weight of the wheel trays 910. In the embodiment illustrated in FIGS. 9-12, some of these holes have an "H" geometry, but it should be appreciated that the geometry of the holes may be modified in various ways. The positioning wheel 916 of the bicycle rack 900 has several holes disposed therethrough.

Figure 13A:
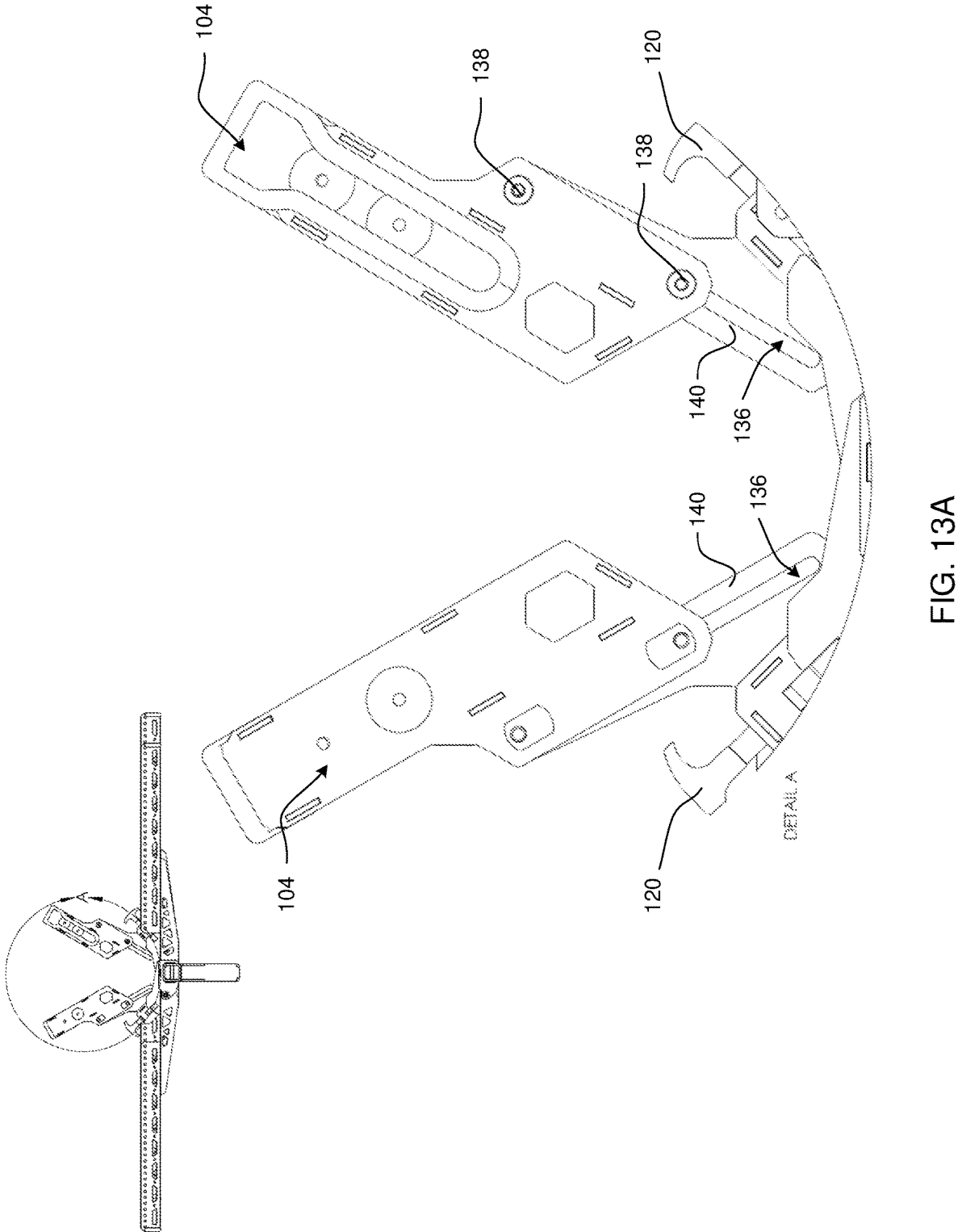
FIG. 13A is a close-up view of an articulating wheel support locking assembly and crank restraint for receiving a crank arm of a bicycle, wherein the crank restraint is fully extended.
Figure 13B:
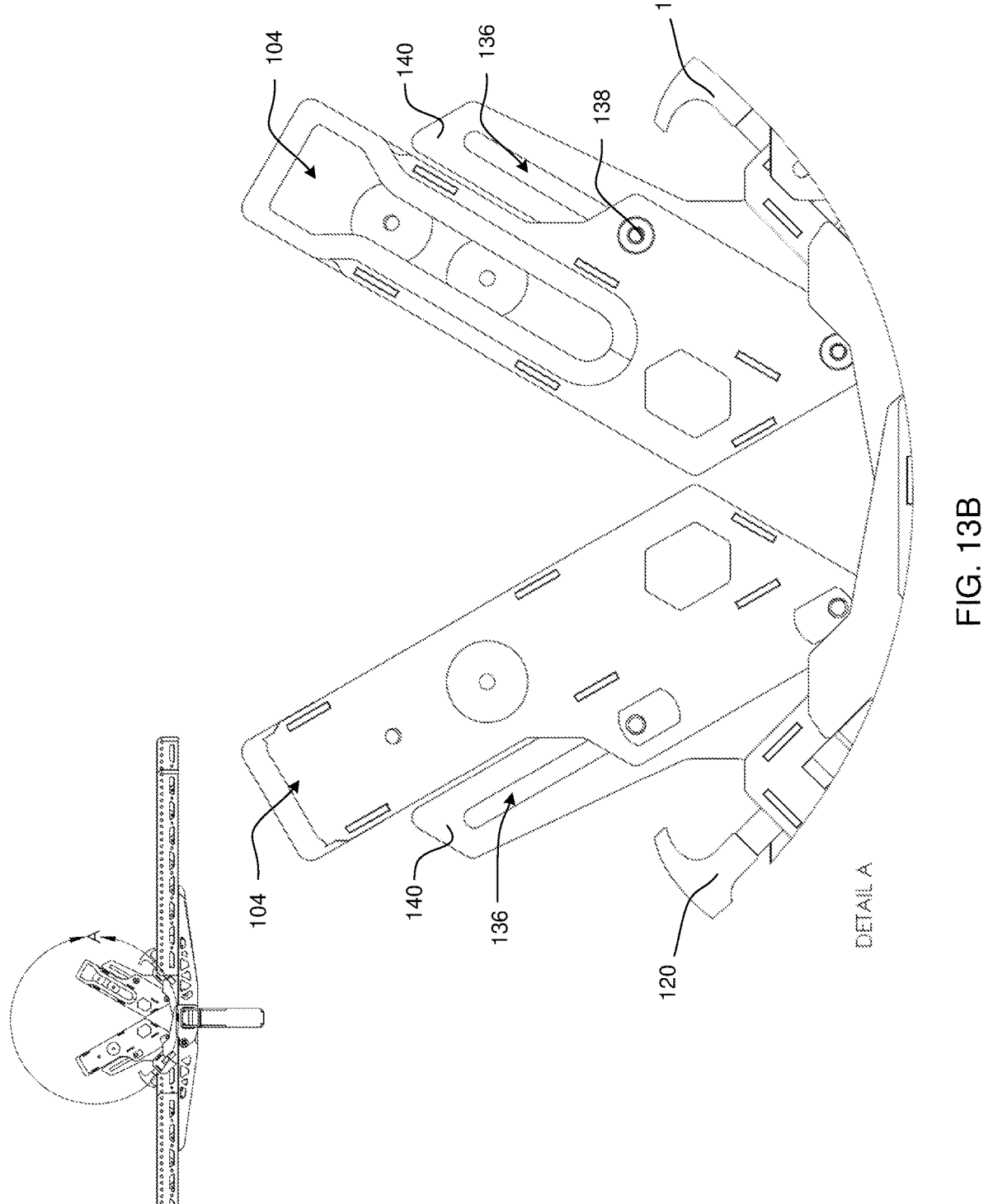
FIG. 13B is a close-up view of an articulating wheel support locking assembly and crank restraint for receiving a crank arm of a bicycle, wherein the crank restraint is fully depressed.

FIGS. 13A and 13B illustrate close-up views of the crank restraint 104 of the bicycle rack 100. FIG. 13A illustrates wherein the crank restraint 104 is fully extended along the sliding linear guide 136 of the restraint post 140. In this implementation, the crank restraint 104 is at its maximum length relative to the articulating wheel support 106. This implementation will support bicycles with longer crank arms and/or bigger frame sizes. FIG. 13B illustrates wherein the crank restraint 104 is fully depressed along the sliding linear guide 136 of the restraint post 140. In this implementation, the crank restraint 104 is at its shortest length relative to the articulating wheel support 106. This implementation will support bicycles with shorter crank arms and/or smaller frame sizes.

When installing a bicycle in the bicycle rack 100, the crank restraint 104 may be rotated to be substantially parallel with the ground plane and the articulating wheel support 106 may be dropped and allowed to lower toward the ground plane. A user may then walk a bicycle up the articulating wheel support 106 and cause the crank arm of the bicycle to feed into the crank restraint 104. When the crank arm of the bicycle is secured within the crank restraint 104, the user may then roll the front wheel of the bicycle further up the bicycle rack 100 and on to the stationary wheel support 108. The bicycle is then secured on to the bicycle rack 100.

Figure 14:
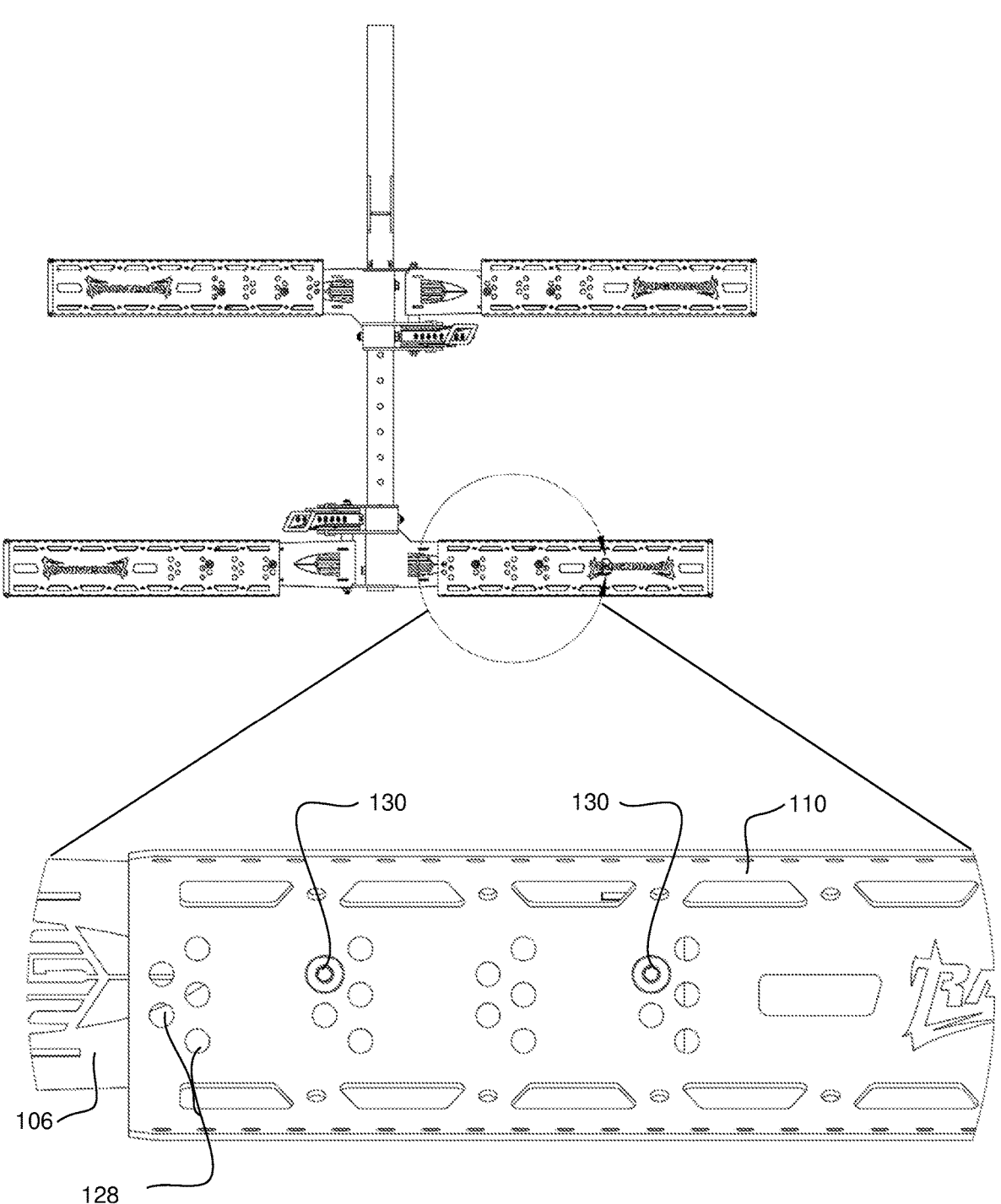
FIG. 14 is a close-up top-down aerial view of a portion of a wheel tray.

FIG. 14 is a close-up of an aerial top-down view of a wheel tray 110 installed on to an articulating wheel support 106. As shown in FIG. 14, the wheel tray 110 includes a plurality of tray holes 128 disposed therethrough. The tray holes 128 are cut through the wheel tray 110 in an arrangement optimizing for accommodating varying tire widths of different types of bicycles, including road bicycles, mountain bicycles, and electric bicycles. The wheel tray 110 is releasably secured to the articulating wheel support 106 with the fastening mechanism 130. A user may easily undo the fastening mechanism 130 to remove the wheel tray 110 and then reposition the wheel tray over the articulating wheel support 106. This enables a user to optimize the distance from the wheel tray 110 to the crank restraint 104 (now shown in FIG. 14) to accommodate varying tire sizes. For example, if using a road bicycle, the user may minimize the distance between the wheel tray 110 and the crank restraint 104 to ensure that the narrow tire of the road bicycle can rests on the wheel tray 110 when the crank arm of the road bicycle is disposed within the crank restraint 104. Further for example, if using an electric bicycle, the user may maximize the distance between the wheel tray 110 and the crank restraint 104 to ensure that the wide width of the tire of the electric bicycle is accommodated on the wheel tray 110 when the crank arm of the electric bicycle is disposed within the crank restraint 104.

Figure 15:
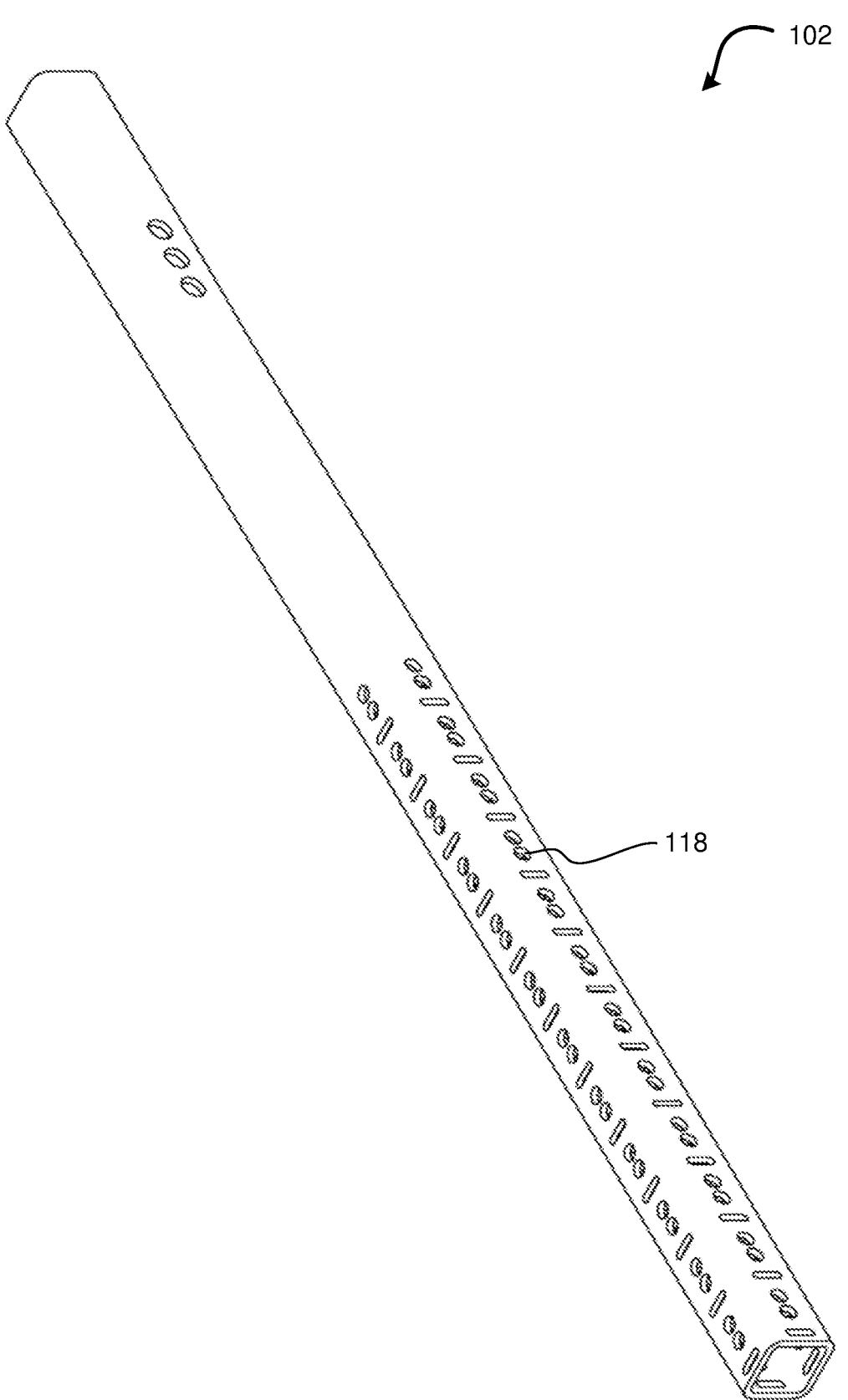
FIG. 15 is a perspective view of a straight mounting post of a bicycle rack, wherein the straight mounting post is configured to be received by a hitch of a towing vehicle.
Figure 16:
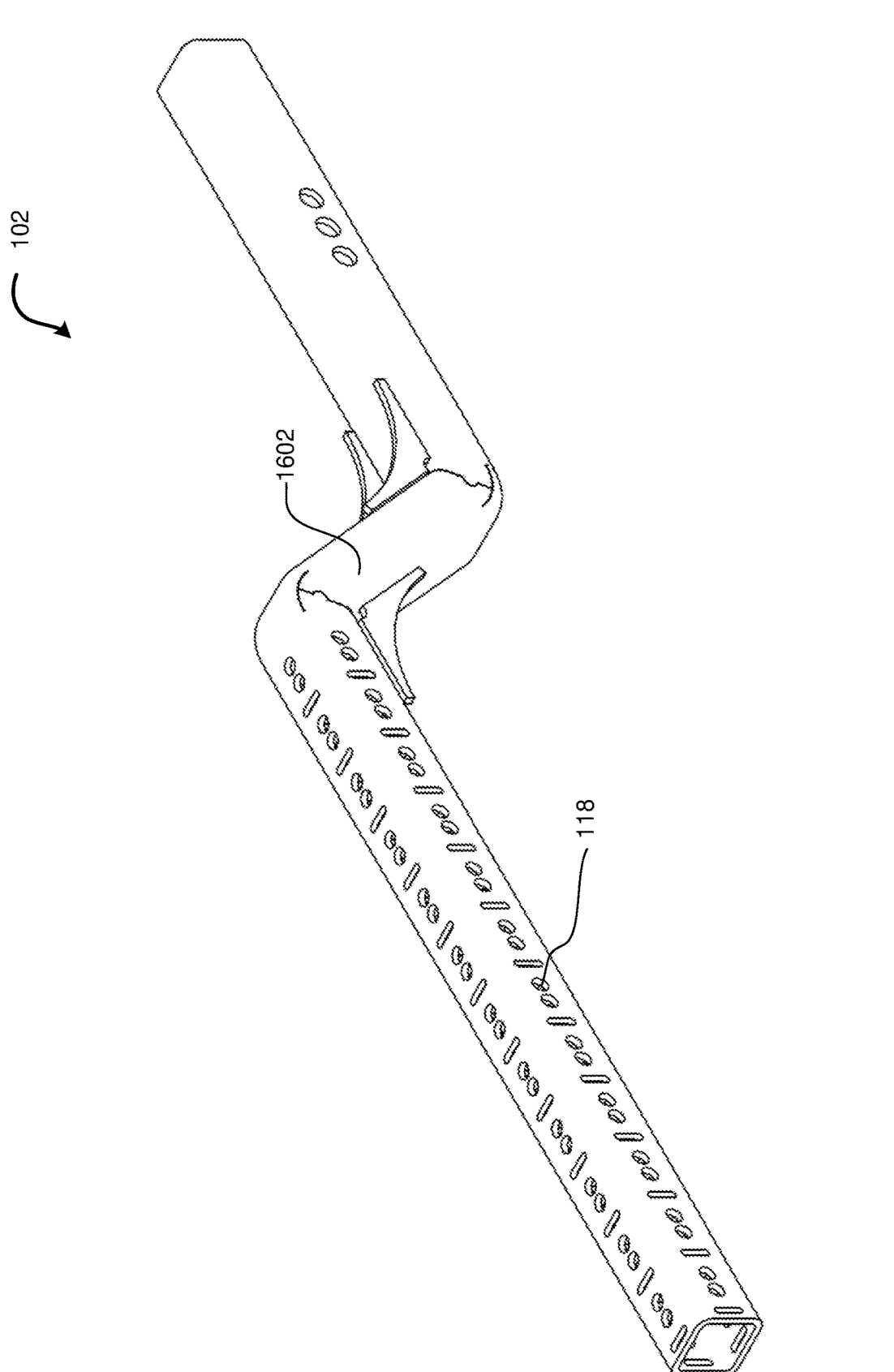
FIG. 16 is a perspective view of a bent mounting post of a bicycle rack, wherein the bent mounting post is configured to be received by a hitch of a towing vehicle.
Figure 17:
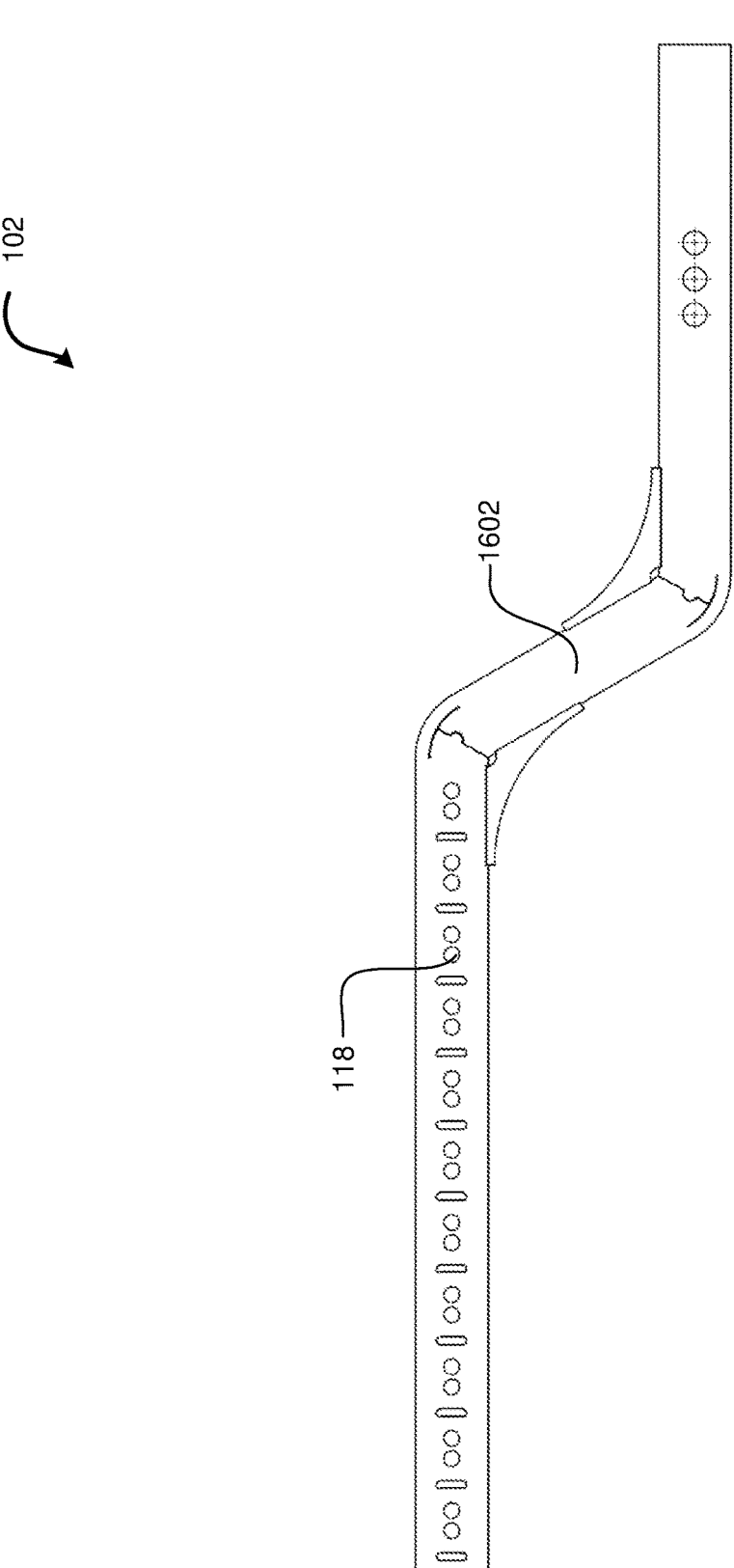
FIG. 17 is a straight-on side view of a bent mounting post of a bicycle rack, wherein the bent mounting post is configured to be received by a hitch of a towing vehicle.

FIGS. 15-17 illustrate implementations of the mounting post 102. FIG. 15 is a perspective view of a straight mounting post 102, such as the one illustrated in FIGS. 1-10. FIGS. 16-17 illustrate views of a bent mounting post 102. Specifically, FIG. 16 illustrates a perspective view of the bent mounting post 102 and FIG. 17 illustrates a straight-on side view of the bent mounting post 102.

Either of the straight mounting post 102 or the bent mounting post 102 may be implemented with any of the bicycle rack 100, 900 features as described herein. The straight mounting post 102 and the bent mounting post 102 may be selected based on the height of the towing vehicle and the associated vehicular hitch.

As shown in FIGS. 16-17, the bent mounting post 102 includes a vertical curvature 1602 to accommodate hitches that are too high above ground or too close to the ground. In some cases, a hitch is raised high above ground (e.g., if the towing vehicle is a lifted truck) and it is difficult to access the bicycle rack 100 due to the increased height of the hitch. In this case, the vertical curvature 1602 may drop the bicycle rack 100 close to the ground to enable a user to access and utilize the bicycle rack more easily. In an alternative implementation, the hitch is too close to the ground (e.g., if the towing vehicle is a low automobile) and the extended length of the bicycle rack 100 causes issues when driving the towing vehicle. In this case, the vehicle curvature 1602 may lift the bicycle rack 100 farther above ground relative to the vehicular hitch.

The mounting post 102 includes a plurality of mounting holes 118 cut through one or more sidewalls of the mounting post 102. The mounting post 102 may be constructed of a plurality of sidewalls arranged in a quadrilateral cross-sectional geometry, such that the mounting post 102 is hollow. The plurality of mounting holes 118 are cut through two or more of the plurality of sidewalls of the mounting post 102. The mounting holes 118 enable a user to install the bicycle support apparatus (including at least the crank restraint 104, articulating wheel support 106, and stationary wheel support 108) at different positions along the longitudinal axis 132 of the bicycle rack 100.

EXAMPLES

The following examples pertain to further embodiments.

Example 1 is a device. The device includes a mounting post configured to be secured within a vehicular hitch of a towing vehicle. The device includes a stationary wheel support attached to the mounting post, wherein the stationary wheel support is attached to the mounting post such that a longitudinal axis of the stationary wheel support is substantially parallel to a ground plane when the mounting post is secured within the vehicular hitch of the towing vehicle. The device includes an articulating wheel support attached to the mounting post. The articulating wheel support is configured to articulate at a joint disposed adjacent to the mounting post.

Example 2 is a device as in Example 1, further comprising an articulation lock configured to lock the articulating wheel support in a locked position, wherein a longitudinal axis of the articulating wheel support is substantially parallel to the ground plane when in the locked position.

Example 3 is a device as in any of Examples 1-2, wherein the joint of the articulating wheel support enables the articulating wheel support to rotate toward the ground plane when in an unlocked position.

Example 4 is a device as in any of Examples 1-3, further comprising a plurality of wheel trays, wherein the plurality of wheel trays comprises a first wheel tray attached to the stationary wheel support, and wherein the plurality of wheel trays further comprises a second wheel tray attached to the articulating wheel support.

Example 5 is a device as in any of Examples 1-4, wherein the stationary wheel support is configured to support a front wheel of a bicycle.

Example 6 is a device as in any of Examples 1-5, wherein the articulating wheel support is configured to support a rear wheel of a bicycle.

Example 7 is a device as in any of Examples 1-6, further comprising a crank restraint configured to receive a crank arm of a bicycle gear.

Example 8 is a device as in any of Examples 1-7, wherein the crank restraint comprises a plurality of sidewalls defining a crank arm receptacle, and wherein the crank arm of the bicycle gear is configured to be secured within the crank arm receptacle.

Example 9 is a device as in any of Examples 1-8, wherein the crank restraint comprises four sidewalls, and wherein one of the four sidewalls comprises a crank arm cutout cut into the sidewalls, and wherein the crank arm cutout is configured to receive at least a portion of the crank arm of the bicycle gear.

Example 10 is a device as in any of Examples 1-9, wherein the crank restraint is configured to secure the crank arm of the bicycle gear to prevent a bicycle from moving forward or backward when installed in the device.

Example 11 is a device as in any of Examples 1-10, wherein the crank restraint is configured to secure the crank arm of the bicycle gear to prevent the bicycle from moving from side to side when the installed in the device.

Example 12 is a device as in any of Examples 1-11, wherein the device is a bicycle rack configured to be attached to the two vehicle by way of the vehicular hitch.

Example 13 is a device as in any of Examples 1-12, wherein the mounting post comprises a longitudinal axis, and wherein the longitudinal axis of the stationary wheel support is substantially perpendicular to the longitudinal axis of the mounting post.

Example 14 is a device as in any of Examples 1-13, wherein the mounting post comprises a longitudinal axis, and wherein the longitudinal axis of the articulating wheel support is substantially perpendicular to the longitudinal axis of the mounting post.

Example 15 is a device as in any of Examples 1-14, wherein the stationary wheel support is releasably attached to the mounting post on a horizontal top side of the mounting post, wherein the horizontal top side of the mounting post is a topmost side relative to the ground plane.

Example 16 is a device as in any of Examples 1-15, wherein the articulating wheel support is releasably attached to the mounting post on a vertical side of the mounting post, wherein the vertical side is substantially perpendicular to the ground plane when the mounting post is secured within the vehicular hitch of the towing vehicle.

Example 17 is a device as in any of Examples 1-16, wherein a length of at least one of the wheel trays is optimized such that the wheel tray touches the ground plane when the articulating wheel support is in the unlocked position.

Example 18 is a device as in any of Examples 1-17, wherein the articulating wheel support is allowed to drop to the ground plane when in the unlocked position.

Example 19 is a device as in any of Examples 1-18, wherein the articulating wheel support is allowed to drop to a threshold angle when in the unlocked position, wherein the threshold angle is measured relative to the longitudinal axis of the stationary wheel support, and wherein the threshold angle is optimized for rolling a front wheel of a bicycle up the articulating wheel support.

Example 20 is a device as in any of Examples 1-19, further comprising rotational wheel comprising a plurality of holes disposed therethrough, and wherein the plurality of holes are positioned for securing the articulating wheel support into one of a plurality of threshold angles relative to the ground plane.

Example 21 is a device as in any of Examples 1-20, wherein a width of at least one of the plurality of wheel trays is optimized for receiving a tire of an electric bicycle.

Example 22 is a device as in any of Examples 1-21, wherein a width of at least one of the plurality of wheel trays is optimized for receiving a tire of a mountain bicycle.

Example 23 is a device as in any of Examples 1-22, wherein a width of at least one of the plurality of wheel trays is optimized for receiving a tire of a road bicycle.

Example 24 is a device as in any of Examples 1-23, wherein the articulating wheel support is rotationally coupled to the crank restraint.

Example 25 is a device as in any of Examples 1-24, wherein the articulating wheel support is mechanically attached and rotationally coupled to the crank restraint with a coupling post 122 that is attached to the articulating wheel support on a first end and is attached to the crank restraint on an opposite end.

Example 26 is a device as in any of Examples 1-25, further comprising a positioning wheel attached to the crank restraint, wherein the positioning wheel comprises a bolt cavity cut into a perimeter of the positioning wheel.

Example 27 is a device as in any of Examples 1-26, further comprising a spring lock configured to lock the crank restraint in a rotational position, wherein the spring lock comprises a pin and a bolt.

Example 28 is a device as in any of Examples 1-27, wherein the bolt of the spring lock is configured to be disposed within the bolt cavity of the positioning wheel, and wherein a rotational position of the crank restraint is locked when the bolt of the spring lock is disposed within the bolt cavity of the positioning wheel.

Example 29 is a device as in any of Examples 1-28, wherein the spring lock comprises a spring such that the spring lock is disengaged when a user pulls on the pin to the compress the spring and remove the bolt from the bolt cavity of the positioning wheel.

Example 30 is a device as in any of Examples 1-29, wherein the bolt cavity is positioned on the positioning wheel such that the longitudinal axis of the articulating wheel support is substantially parallel to the ground plane when the bolt is disposed within the bolt cavity.

Example 31 is a device. The device includes mounting post configured to be secured within a vehicular hitch of a towing vehicle. The device includes a stationary wheel support attached to the mounting post, wherein the stationary wheel support is attached to the mounting post such that a longitudinal axis of the stationary wheel support is substantially parallel to a ground plane when the mounting post is secured within the vehicular hitch of the towing vehicle. The device includes an articulating wheel support attached to the mounting post, wherein the articulating wheel support comprises a joint enabling the articulating wheel support to rotate about an axis disposed along a longitudinal axis of the mounting post.

Example 32 is a device as in Example 31, further comprising a crank restraint comprising a cavity configured to receive a crank arm of a bicycle, wherein the crank restraint is coupled to the articulating wheel support.

Example 33 is a device as in any of Examples 31-32, further comprising: a restraint post attached to the articulating wheel support; and a crank restraint comprising a cavity configured to receive a crank arm of a bicycle, wherein the crank restraint is attached to the restraint post.

Example 34 is a device as in any of Examples 31-33, wherein the restraint post comprises a sliding linear guide constituting a cavity disposed within the restraint post.

Example 35 is a device as in any of Examples 31-34, wherein the crank restraint comprises a sidewall having a hole disposed therethrough; and wherein the hole is configured to receive a shaft of a fastening mechanism.

Example 36 is a device as in any of Examples 31-35, wherein the shaft of the fastening mechanism is configured to be disposed through the sliding linear guide of the restraint post and further through the hole of the crank restraint; and wherein tightening the fastening mechanism locks the crank restraint into a desired position along the sliding linear guide of the restraint post.

Example 37 is a device as in any of Examples 31-36, further comprising a crank restraint comprising a cavity configured to receive a crank arm of a bicycle, wherein the crank restraint is coupled to the articulating wheel support such that the crank restraint and the articulating wheel support simultaneously rotate about the axis disposed along the longitudinal axis of the mounting post.

Example 38 is a device as in any of Examples 31-37, further comprising an articulating wheel support locking assembly, wherein the locking assembly comprises: a bolt; a spring lock; and a pin coupled to the spring lock; wherein stretching a spring of the spring lock by pulling on the pin causes the bolt to retreat in a direction toward the crank restraint; and wherein releasing the spring of the spring lock by releasing the pin causes the bolt to extend in a direction away from the crank restraint.

Example 39 is a device as in any of Examples 31-38, wherein the locking assembly is coupled to the articulating wheel support such that the articulating wheel support and one or more components of the locking assembly simultaneously rotate about the axis disposed along the longitudinal axis of the mounting post.

Example 40 is a device as in any of Examples 31-39, further comprising a positioning wheel comprising a bolt cavity, wherein the bolt cavity is configured to receive the bolt of the locking assembly when the spring of the spring lock is released.

Example 41 is a device as in any of Examples 31-40, wherein the bolt cavity is disposed through a sidewall of the positioning wheel at a position that causes the articulating wheel support to lock into a locked position, wherein a longitudinal axis of the articulating wheel support is substantially parallel to the ground plane when locked into the locked position.

Example 42 is a device as in any of Examples 31-41, further comprising: a first wheel tray attached to the stationary wheel support; and a second wheel tray attached to the articulating wheel support; wherein each of the first wheel tray and the second wheel tray is configured to receive a wheel of a bicycle.

Example 43 is a device as in any of Examples 31-42, wherein each of the first wheel tray and the second wheel tray comprises: a bottom wheel support comprising a first longitudinal side and a second longitudinal side that is opposite to the first longitudinal side, wherein the wheel of the bicycle rests on the bottom wheel support; a first sidewall attached to the bottom wheel support at the first longitudinal side; and a second sidewall attached to the bottom wheel support at the second longitudinal side.

Example 44 is a device as in any of Examples 31-43, wherein a combination of the first wheel tray and the second wheel tray supports a bicycle when the articulating wheel support is in a locked position; and wherein the bottom wheel support of each of the first wheel tray and the second wheel tray is substantially parallel to the ground plane when the articulating wheel support is in the locked position.

Example 45 is a device as in any of Examples 31-44, wherein, for each of the first wheel tray and the second wheel tray, at least a portion of the first sidewall and the second sidewall is substantially perpendicular to the ground plane when the articulating wheel support is in the locked position.

Example 46 is a device as in any of Examples 31-45, wherein the mounting post comprises a plurality of sidewalls such that the mounting post is hollow and comprises a quadrilateral cross-sectional geometry.

Example 47 is a device as in any of Examples 31-46, wherein at least two sidewalls of the plurality of sidewalls of the mounting post comprises a plurality of holes disposed therethrough; and wherein the plurality of holes enable a user to attach one or more of the stationary wheel support or the articulating wheel support to the mounting post at an optimized position along the longitudinal axis of the mounting post.

Example 48 is a device as in any of Examples 31-47, further comprising an articulating wheel support locking assembly; wherein the joint of the articulating wheel support enables a distal end of the articulating wheel support to drop toward the ground plane when the locking assembly is in an unlocked position; and wherein a longitudinal axis of the articulating wheel support is substantially parallel to the ground plane when the locking assembly is in a locked position.

Example 49 is a device as in any of Examples 31-48, further comprising a crank restraint configured to receive a crank arm of a bicycle; wherein a front wheel of the bicycle rests on the stationary wheel support when the locking mechanism is in the locked position; and wherein a rear wheel of the bicycle rests on the articulating wheel support when the locking mechanism is in the locked position.

Example 50 is a device as in any of Examples 31-49, further comprising one or more straps configured to secure a bicycle to one or more of the articulating wheel support or the stationary wheel support.

The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

In the foregoing Detailed Description, various features of the disclosure are grouped together in a single implementation for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed implementation. Thus, the following claims are hereby incorporated into this Detailed Description by this reference, with each claim standing on its own as a separate implementation of the disclosure.

It is to be understood that the above-described arrangements are only illustrative of the application of the principles of the disclosure. Numerous modifications and alternative arrangements may be devised by those skilled in the art without departing from the spirit and scope of the disclosure and the appended claims are intended to cover such modifications and arrangements. Thus, while the disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

Reference throughout this specification to "an example" means that a particular feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive.

Those having skill in the art will appreciate that many changes may be made to the details of the above-described embodiments without departing from the underlying principles of the disclosure. The scope of the present disclosure should, therefore, be determined only by the following claims.

What is claimed is:

1. A device comprising:
   a mounting post configured to be secured within a vehicular hitch of a towing vehicle;
   a stationary wheel support attached to the mounting post, wherein the stationary wheel support is attached to the mounting post such that a longitudinal axis of the stationary wheel support is substantially parallel to a ground plane when the mounting post is secured within the vehicular hitch of the towing vehicle;
   an articulating wheel support attached to the mounting post, wherein the articulating wheel support comprises a joint enabling the articulating wheel support to rotate about an axis disposed along a longitudinal axis of the mounting post; and
   a crank restraint comprising a cavity configured to receive a crank arm of a bicycle, wherein the crank restraint is coupled to the articulating wheel support such that the crank restraint and the articulating wheel support simultaneously rotate about the axis disposed along the longitudinal axis of the mounting post.

2. The device of claim 1, further comprising:

a restraint post attached to the articulating wheel support; and wherein the crank restraint is attached to the restraint post.

3. The device of claim 2, wherein the restraint post comprises a sliding linear guide constituting a cavity disposed within the restraint post.

4. The device of claim 3, wherein the crank restraint comprises a sidewall having a hole disposed therethrough; and wherein the hole is configured to receive a shaft of a fastening mechanism.

5. The device of claim 4, wherein the shaft of the fastening mechanism is configured to be disposed through the sliding linear guide of the restraint post and further through the hole of the crank restraint; and wherein tightening the fastening mechanism locks the crank restraint into a desired position along the sliding linear guide of the restraint post.

6. The device of claim 1, further comprising an articulating wheel support locking assembly, wherein the locking assembly comprises:

a bolt;

a spring lock; and a pin coupled to the spring lock;

wherein stretching a spring of the spring lock by pulling on the pin causes the bolt to retreat in a direction toward the crank restraint; and wherein releasing the spring of the spring lock by releasing the pin causes the bolt to extend in a direction away from the crank restraint.

7. The device of claim 6, wherein the locking assembly is coupled to the articulating wheel support such that the articulating wheel support and one or more components of the locking assembly simultaneously rotate about the axis disposed along the longitudinal axis of the mounting post.

8. The device of claim 6, further comprising a positioning wheel comprising a bolt cavity, wherein the bolt cavity is configured to receive the bolt of the locking assembly when the spring of the spring lock is released.

9. The device of claim 8, wherein the bolt cavity is disposed through a sidewall of the positioning wheel at a position that causes the articulating wheel support to lock into a locked position, wherein a longitudinal axis of the articulating wheel support is substantially parallel to the ground plane when locked into the locked position.

10. The device of claim 1, further comprising:

a first wheel tray attached to the stationary wheel support; and a second wheel tray attached to the articulating wheel support;

wherein each of the first wheel tray and the second wheel tray is configured to receive a wheel of a bicycle.

11. The device of claim 10, wherein each of the first wheel tray and the second wheel tray comprises:

a bottom wheel support comprising a first longitudinal side and a second longitudinal side that is opposite to the first longitudinal side, wherein the wheel of the bicycle rests on the bottom wheel support;

a first sidewall attached to the bottom wheel support at the first longitudinal side; and a second sidewall attached to the bottom wheel support at the second longitudinal side.

12. The device of claim 11, wherein a combination of the first wheel tray and the second wheel tray supports a bicycle when the articulating wheel support is in a locked position; and wherein the bottom wheel support of each of the first wheel tray and the second wheel tray is substantially parallel to the ground plane when the articulating wheel support is in the locked position.

13. The device of claim 12, wherein, for each of the first wheel tray and the second wheel tray, at least a portion of the first sidewall and the second sidewall is substantially perpendicular to the ground plane when the articulating wheel support is in the locked position.

14. The device of claim 1, wherein the mounting post comprises a plurality of sidewalls such that the mounting post is hollow and comprises a quadrilateral cross-sectional geometry.

15. The device of claim 14, wherein at least two sidewalls of the plurality of sidewalls of the mounting post comprises a plurality of holes disposed therethrough; and wherein the plurality of holes enable a user to attach one or more of the stationary wheel support or the articulating wheel support to the mounting post at an optimized position along the longitudinal axis of the mounting post.

16. The device of claim 1, further comprising an articulating wheel support locking assembly;

wherein the joint of the articulating wheel support enables a distal end of the articulating wheel support to drop toward the ground plane when the locking assembly is in an unlocked position; and wherein a longitudinal axis of the articulating wheel support is substantially parallel to the ground plane when the locking assembly is in a locked position.

17. The device of claim 16, further comprising a locking mechanism;

wherein a front wheel of the bicycle rests on the stationary wheel support when the locking mechanism is in the locked position; and wherein a rear wheel of the bicycle rests on the articulating wheel support when the locking mechanism is in the locked position.

18. The device of claim 1, further comprising one or more straps configured to secure a bicycle to one or more of the articulating wheel support or the stationary wheel support.

* * * * *